United States Patent [19]

Muramatsu

[11] Patent Number: 5,536,464
[45] Date of Patent: Jul. 16, 1996

[54] APPARATUS AND METHOD FOR CURING ENDLESS RUBBER TRACK

[75] Inventor: Tateo Muramatsu, Yokohama, Japan

[73] Assignee: Bridgestone/Firestone, Inc., Akron, Ohio

[21] Appl. No.: 339,996

[22] Filed: Nov. 15, 1994

[51] Int. Cl.$^6$ .............. B29C 35/04; B29C 33/04
[52] U.S. Cl. .......... 264/254; 156/140; 264/236; 264/347; 425/28.1; 425/34.2; 425/343; 425/384; 425/446
[58] Field of Search .................. 264/254, 236, 264/347; 156/140; 425/445, 384, 28.1, 34.2, 446, 395, 335, 343

[56] References Cited

U.S. PATENT DOCUMENTS

| | | | |
|---|---|---|---|
| D. 302,017 | 7/1989 | Grawey et al. | D15/28 |
| D. 309,314 | 7/1990 | Grawey et al. | D15/28 |
| 2,327,566 | 8/1943 | Slusher | 425/34.2 |
| 2,602,188 | 7/1952 | Gorecki | 425/28.1 |
| 2,746,811 | 5/1956 | Benson . | |
| 2,867,845 | 1/1959 | Sauer . | |
| 3,418,929 | 12/1968 | Nelson | 156/140 |
| 3,618,263 | 11/1971 | Folkes . | |
| 3,791,897 | 2/1974 | Mesly | 156/137 |
| 3,837,779 | 9/1974 | Weinschenk | 425/28 B |
| 3,856,907 | 12/1974 | Cicognani | 264/254 |
| 3,860,684 | 1/1975 | Vance, Sr. | 156/140 |
| 4,057,302 | 11/1977 | Caravito | 305/19 |
| 4,071,068 | 1/1978 | Olsen | 152/176 |
| 4,112,574 | 9/1978 | Deli | 264/261 |
| 4,115,510 | 9/1978 | Previati | 264/347 |
| 4,198,103 | 4/1980 | Ward et al. | 305/12 |
| 4,241,956 | 12/1980 | Meisel, Jr. | 305/35 |
| 4,279,285 | 6/1981 | Grawey | 152/330 |
| 4,351,380 | 9/1982 | Pilliod, Jr. et al. | 152/169 |
| 4,359,355 | 11/1982 | Stecklein et al. | 264/347 |
| 4,368,929 | 1/1983 | Beyers et al. | 305/11 |
| 4,407,550 | 10/1983 | Lapsys | 305/35 EB |
| 4,486,375 | 12/1984 | Hirai | 264/254 |
| 4,502,736 | 3/1985 | Johnson | 305/9 |
| 4,530,545 | 7/1985 | Bertelsen | 305/16 |
| 4,589,941 | 5/1986 | Tanaka et al. | 156/140 |
| 4,671,774 | 6/1987 | Owsen | 440/95 |
| 4,678,244 | 7/1987 | Furuta et al. | 305/57 |
| 4,714,302 | 12/1987 | Svensson et al. | 305/35 EB |
| 4,778,537 | 10/1988 | Wach et al. | 474/260 |
| 4,861,403 | 8/1989 | Yoshimi et al. | 156/138 |
| 4,904,030 | 2/1990 | Ono | 305/35 EB |
| 4,906,054 | 3/1990 | Edwards et al. | 305/35 EB |
| 5,110,274 | 5/1992 | Hatai et al. | 425/384 |
| 5,131,728 | 7/1992 | Katoh et al. | 305/35 EB |
| 5,145,242 | 9/1992 | Togashi | 305/35 EB |
| 5,174,638 | 12/1992 | Tokue et al. | 305/35 EB |
| 5,279,378 | 1/1994 | Grawey et al. | 180/9.21 |
| 5,295,741 | 3/1994 | Togashi et al. | 305/38 |

FOREIGN PATENT DOCUMENTS 0578504  1/1994  European Pat. Off. ........ B62D 55/24

*Primary Examiner*—Jeffery R. Thurlow
*Attorney, Agent, or Firm*—Carmen S. Santa Maria

[57] ABSTRACT

The present invention provides novel apparatus and a novel method for manufacturing an endless rubber track for large vehicles such as tractors or earth-moving machines. A plurality of sprocket-engaging core bar inserts are disposed in the inner portion or inner diameter of the endless rubber track to engage the power drive mechanism of the vehicle. Rubber tread is disposed on the outer portion or external diameter of the rubber track. Although the rubber track is made in segments, it is completely vulcanized, and does not have discontinuous, unvulcanized regions between vulcanized segments. Rubber track is formed using at least two different mold assemblies. In the first mold assembly, the interior and exterior portions of the rubber track are molded onto a green belt to form a first segment, and a central portion of the segment is vulcanized. In the second mold assembly, the interior and exterior portions of the rubber track are molded onto an adjacent section of the green belt to form a second belt segment, and the second segment along with the adjacent unvulcanized first segment is vulcanized.

14 Claims, 15 Drawing Sheets

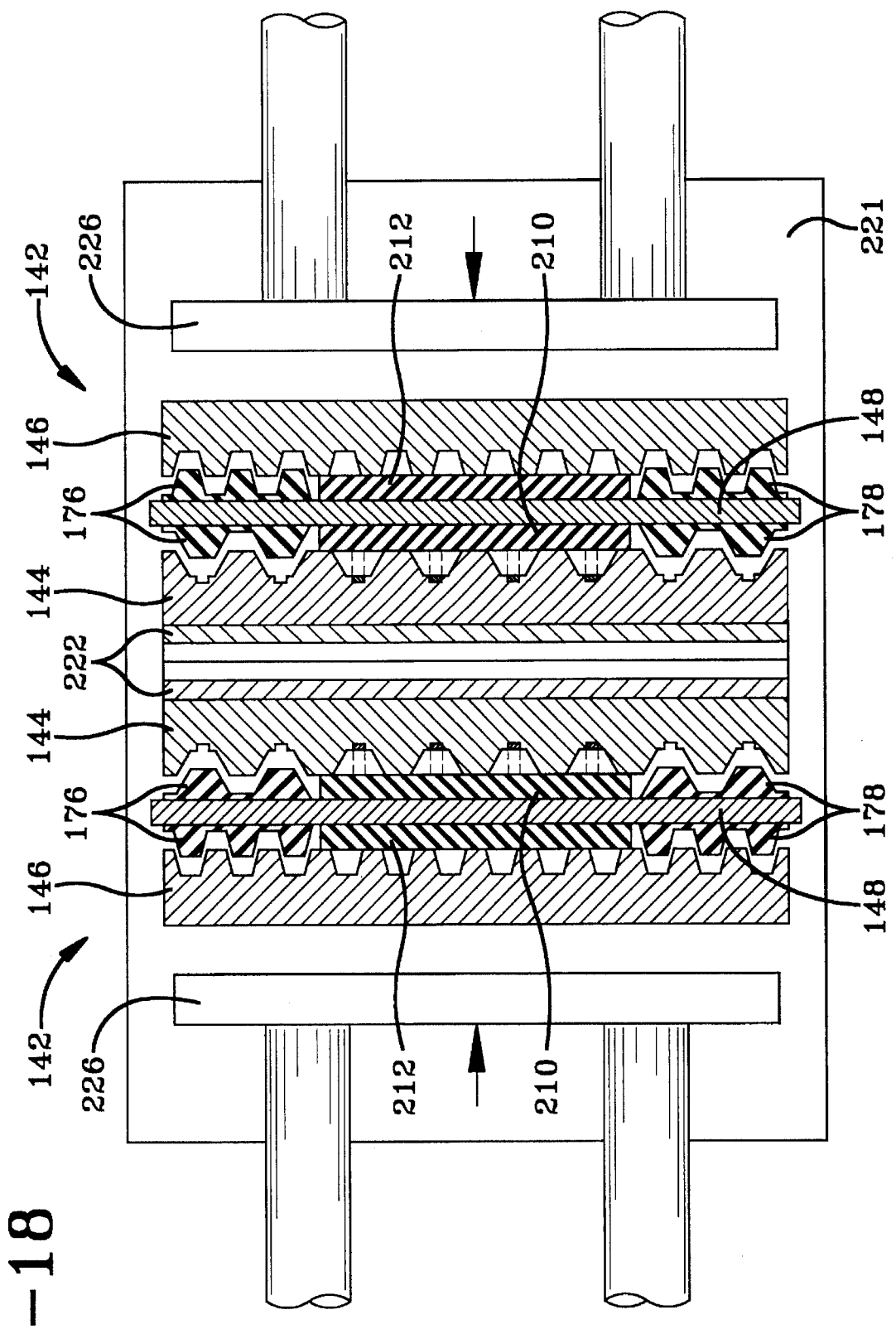

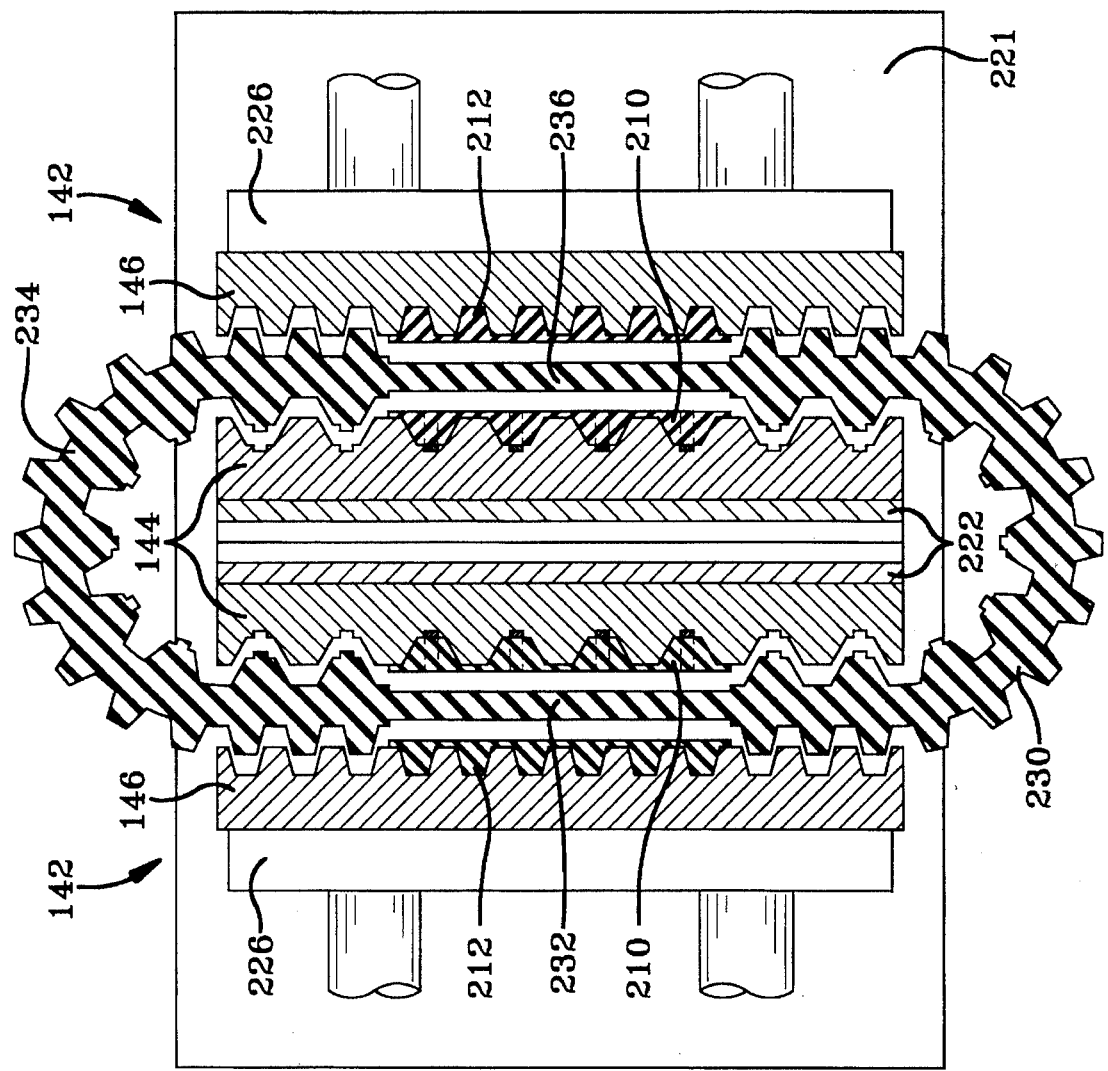

APPARATUS AND METHOD FOR CURING ENDLESS RUBBER TRACK

BACKGROUND OF THE INVENTION

1. Field of the Invention

The present invention relates to elastic endless crawlers or tracks for earth-moving machines, agricultural equipment and the like, in which the track is assembled over drive wheels.

2. Description of the Prior Art

Vehicles such as earth-moving machines and agricultural equipment are constructed with endless tracks which are driven by drive wheels. The track or belt is assembled over a plurality of wheels, at least one of which is a drive wheel, and is engaged by the drive wheel. Increasingly, vehicles used in agriculture are driven by track systems because the tracks have higher traction in soil and cause less ground compaction than vehicles equipped with conventional, pneumatic tires. As a result of this renewed interest in track systems, many improvements in such systems have recently been implemented.

One such improvement, set forth in U.S. Pat. No. 5,279,378 sets forth a vehicle having an endless belt with a highly tensioned elastomeric exterior surface which provides improved frictional coupling between its interior surface and the drive wheel. The improvement is directed to belt tensioning aspects of the invention. The improvement discloses an endless belt comprised of at least one reinforcing filament wrapped substantially parallel to the longitudinal axis of the chassis.

Other improvements, such as described in U.S. Pat. Nos. 5,295,741, 4,678,244 and 4,057,302 are directed at improving the coupling between the interior surface of the track and the drive wheel of the vehicle. While many belts or tracks utilize rubber lugs to accomplish the coupling, such as set forth in U.S. Pat. No. 5,279,378, these improvements utilize core bars, typically of a material of a different composition than the rubber track, to improve coupling.

While some of these improvements are effective, the methods for manufacturing reinforced, endless rubber track for propulsion of agricultural or earth-moving vehicles is both expensive and time-consuming.

Some methods and apparatus are available for making V-belts which may also be applicable to tractor treads or belts. The description of such apparatus and methods is set forth in U.S. Pat. Nos. 2,867,845 and 4,861,403. However, because of the large differences in the sizes of V-belts, which are small, typically having widths measured in inches and fractions thereof, compared to the rubber track utilized in earth-moving vehicles, typically having widths measured in feet, simple scale up of V-belt technology may not always be practical and may not yield usable rubber track because of the size differences.

U.S. Pat. No. 2,867,845 depicts apparatus and method for forming a continuous V-belt. The V-belt is formed in segments and has lugs formed on one side. While such a method and apparatus are suitable for forming continuous V-belts, there are problems with applying these methods to the manufacture of the large tracks required for agricultural or earth-moving equipment. When the V-belts are manufactured in segments and vulcanized in the molds, the segments have parting lines therebetween which are undesirable. Because the segments are individually formed, with each segment vulcanized, the rubber between the segments is not vulcanized across the parting lines, resulting in a discontinuous region. This discontinuous region has less strength than the surrounding vulcanized, cross-linked region. If the tracks are not vulcanized in the mold during forming, but rather formed as green rubber belts and vulcanized separately after forming, then another time-consuming operation is required to vulcanize the rubber after the green belt is formed. Furthermore, since the green rubber belt is vulcanized after molding, the rubber belt no longer being contained by the mold during heating and pressurization, the likelihood of distortion and melting of the belt as a result of out-of-tolerance conditions is significantly increased.

U.S. Pat. No. 4,861,403 is similar to the method of U.S. Pat. No. 2,867,845, but differs in that a fabric-reinforced double toothed belt is formed. As one side of the belt is formed with teeth, it is partially vulcanized. In a subsequent operation, the second side of the belt is formed with teeth, and then the entire belt is vulcanized.

The present invention is directed to an improved rubber track made in accordance with an improved method and with improved-apparatus, overcoming the deficiencies and short-comings of the prior art methods and apparatus for producing endless track.

SUMMARY OF THE INVENTION

The present invention provides novel apparatus and a novel method for manufacturing an endless rubber track for large vehicles such as tractors or earth-moving machines. A plurality of sprocket-engaging core bar inserts are disposed in the inner portion or inner diameter of the endless rubber track to engage the power drive mechanism of the vehicle. Rubber tread is disposed on the outer portion or external diameter of the rubber track. Although the rubber track is made in segments, it is completely vulcanized, and does not have discontinuous, unvulcanized regions between vulcanized segments, such as is found in the prior art.

To provide such a tread, a first mold assembly having an inner mold half and an outer mold half is provided. The inner mold half has a cavity patterned in the form of the interior of the rubber track which is to be produced, while the outer mold half has a cavity patterned in the form of the exterior of the rubber track which is to be produced, the mold cavities being the negative impressions of the rubber track. Each of the mold halves also contain cooling channels located on the ends of the mold so that each end can be cooled and maintained at a temperature lower than the mold interior. Formable material, when placed in the mold, will fill the mold cavity taking the shape of the track. The mold assembly also includes a removable subplate which is positioned between the inner mold half and the outer mold half. The subplate is essentially a flat plate. Positioning means is also provided to properly orient the mold halves in relation to themselves and to the subplate.

A first quantity of green rubber of a desired composition is provided. The green rubber, in the form of a slug, is positioned adjacent the inner mold half of the first mold assembly. The green rubber may occupy a substantial portion of the cavity of the inner mold half.

The subplate is then positioned adjacent to the green rubber so that the green rubber is between one face of the subplate and the inner mold half.

A second quantity of green rubber of a desired composition is positioned adjacent a second face of the subplate which is opposite the first subplate face and the inner mold half. The composition may be the same as or different than the composition of the first quantity of rubber. The outer mold half is then positioned adjacent the second quantity of rubber so that the rubber is between the second face of the subplate and the outer mold half.

The first mold assembly is then heated to a temperature sufficient to soften the green rubber. Simultaneously, pressure is applied to the mold assembly sufficient to completely flow the green rubber into the mold cavities. However, the temperature is held within a range sufficiently low such that rubber vulcanization will not occur, yet sufficiently high such that rubber flows relatively easily under the applied pressure. After the green rubber has flowed to completely fill the cavities of the mold halves, the inner and outer molds halves are separated and the subplate is removed from between the mold halves.

An endless green rubber belt, in the shape of a loop, which may be formed by any conventional process, is now positioned between the inner and outer mold halves, substantially in the region previously occupied by the subplate. The green rubber belt may include any known reinforcement such as steel cord or other reinforcing material, as is well known in the art. The rubber-filled mold halves are closed against a portion of the green rubber belt. Cooling water is supplied to the cooling channels of the mold halves. The assembly is then heated to an elevated temperature. However, the cooling water cools the ends or outer portions of the mold halves for a predetermined length L, while a central portion of the mold assembly is unaffected by the cooling for a predetermined length P. The temperature is raised sufficiently high to vulcanize the rubber in the central portion of the mold assembly for the predetermined length P, yet sufficient cooling is provided so that the rubber in the end portions are not vulcanized. A very thin transition zone of partially vulcanized rubber may exist between the vulcanized portion and the end portion. Simultaneously, pressure is applied to the assembly. The assembly is held under pressure at temperature for a time sufficient to permit essentially the complete vulcanization of the rubber along predetermined length P. Upon removal of the pressure and separation of the mold halves, the endless belt has a rubber track segment formed thereon. The rubber track segment has a vulcanized central portion of length P and a substantially green rubber track segment outer portions each having a length L. This process is then repeated using the first mold assembly at a predetermined distance Q along the endless green belt from the formed rubber track segment until the green belt has a plurality of formed rubber segments separated by the predetermined distance Q.

A second mold assembly having an inner mold half and an outer mold half is provided. The inner mold half has a cavity similar to that of the first mold assembly patterned in the form of the interior of the rubber track which is to be produced, while the outer mold half has cavity also similar to that of the first mold assembly patterned in the form of the exterior of the rubber track which is to be produced. The mold halves of the second mold assembly, however, do not contain cooling channels as do the mold halves of the first mold assembly. Formable material, when placed in the mold will fill the cavity taking the shape of the track. The second mold assembly also includes a removable subplate which is positioned between the inner mold half and the outer mold half. The second mold assembly subplate has three distinct regions, two outboard or end portions extending toward the edges of the subplate and a central portion extending between the outboard or end portions. The central portion is a substantially flat plate having a predetermined length Q, corresponding to the distance between the formed rubber segments made using the first mold assembly. Each of the outboard or end portions is at least equal to, and preferably greater than the length L, which dimension L corresponds to the length of the unvulcanized portions of the formed rubber segments. Each of the outboard or end portions of the subplate has an inner portion patterned in the form of the interior portion of the rubber track, and an outer portion patterned in the form of the exterior portion of the rubber track. When the subplate is assembled between the mold halves, the outboard or end portions engage the corresponding portions of the mating inner mold half and outer mold half cavities, filling the cavities. Thus, when assembled between the mold halves, the subplate assures that the formable material fills the central portion of the mold assembly while preventing material from entering the cavities positioned adjacent the outboard or end portions of the subplate. Positioning means is also provided to properly orient the mold halves in relation to themselves and to the removable subplate.

A third quantity of green rubber having the same composition as the first quantity of green rubber is positioned adjacent the inner mold half of the second mold assembly. By calculation and careful subsequent measurement, the amount of green rubber supplied can be sufficient to fill the inner mold half cavity opposite the central portion of the subplate, with little or no overage or waste.

A first side of the subplate is positioned adjacent to the third quantity of green rubber utilizing positioning means, to thus assure that the subplate outboard portions properly mate with the corresponding cavities in the mold half.

A fourth quantity of green rubber having the same composition as the first quantity of green rubber is positioned adjacent a second side of the subplate. Again, the quantity of rubber supplied is sufficient to fill the mold cavity of the outer mold opposite the central portion of the subplate, with little or no overage or waste.

The outer mold half is assembled over the fourth quantity of green rubber, Again, positioning means is utilized to assure that the subplate outboard or end portions properly mate with the corresponding cavities in the outer mold half. The second mold assembly is now heated to raise the temperature of the third and fourth quantities of green rubber sufficiently to soften the rubber, but not so high as to cause the rubber to vulcanize. Simultaneously, pressure is applied to the second mold assembly so the rubber readily flows to fill the inner and outer mold cavities opposite the central portion of the subplate. The outboard or end portions of the subplate fill the inner and outer mold half cavities adjacent to its central portion, and thereby prevent the flow of rubber into the cavities in the outboard portions of the mold. Subsequent to this molding operation, the inner and outer mold halves are separated from the mold and the subplate is removed.

Next, a portion of the green belt lying between the formed rubber track segments made using the first mold assembly is positioned between the second mold assembly halves. The length of the green belt Q corresponds to the length Q of the central portion of the second mold cavities filled with green rubber. The outer portions of the mold halves, having a length equal to or greater than L, overlap the green rubber portions L of the formed rubber track segments made using the first mold assembly. These portions L of the formed rubber track segments are substantially unvulcanized, but may include the thin transition zone of partially vulcanized rubber. Preferably, the outer portions of the mold halves are of a length greater than L, so that at least a portion of the overlapped, formed rubber track segments made during the prior operation with the first mold assembly includes rubber which was completely vulcanized in the first mold. This vulcanized rubber, positioned in the cavities of the outer portions of the second mold assembly adjacent the unvulcanized rubber, serves as packing to prevent movement of the green rubber from the central portion during subsequent operations.

The second mold assembly, with the green belt and substantially unvulcanized portions of the formed rubber track segment sandwiched therebetween, is closed and heat is applied to raise the temperature of the rubber above the vulcanization temperature, while pressure is applied to the assembly. The green rubber positioned between the mold halves is now vulcanized, producing a fully vulcanized track segment. The mold halves can then be removed and the process repeated. After this process is repeated at each of the green belt segments of predetermined length Q, a complete endless vulcanized rubber track having no discontinuous regions is produced.

One of the major advantages of a rubber track produced in the apparatus of the present invention and by the process of the present invention is that although the rubber track is formed in segments, the rubber between the segments is vulcanized, that is, properly cross-linked, eliminating the weak, discontinuous region as found in prior art processes in which the segments themselves are vulcanized, but wherein the cross-linking does not extend across the parting line. This weak region having been eliminated, the vulcanized rubber track of the present invention is not prone to a failure across the weak region.

Other features and advantages of the present invention will become apparent from the following more detailed description of the preferred embodiment, taken in conjunction with the accompanying drawings, which will illustrate, by way of example, the principles of the invention.

BRIEF DESCRIPTION OF THE DRAWINGS

FIG. 9 is a side cross-sectional view of the second mold assembly with green rubber slugs positioned above and below the subplate prior to molding, while

FIG. 18 is a sectional view of a preferred embodiment of the second mold assemblies of the present invention loaded with green rubber after pivoting the assemblies 90°, the longitudinal axis of the assemblies being vertical;

FIG. 19 is a sectional view of a preferred embodiment of the present invention showing the partially completed rubber track and the green belt, viewed on edge and positioned between a pair of second mold assemblies, the longitudinal axis of the mold assemblies being parallel to the belt edge.

DETAILED DESCRIPTION OF THE PREFERRED EMBODIMENTS

The present invention is directed to a novel method and apparatus for manufacturing an endless rubber track. The rubber track is characterized by a belt positioned between the sprocket-engaging inner surface and the treaded outer surface.

Preferably, the belt is continuous and does not include a splice. In an optional configuration, the track is further characterized by the inclusion of hard, sprocket-engaging core bar inserts extending inward of the inner surface of the rubber track for engaging the tractor drive mechanism.

The belt is positioned between the inner and outer portion of the rubber track. The belt may be formed by any process well-known in the art. Although a continuous steel belt is preferred for the main cord, a fabric belt may also be used. In addition to the belt main cord, the belt preferably includes at least one bias ply. When a bias ply is included, it is positioned at an angle of ±30°–60° to the main cord, and preferably at an angle of ±45° to the main cord. It is understood, however, that a bias ply is not required to be assembled to the main cord. The belt may be comprised solely of the main cord. The belt is initially formed as a green rubber belt, which is made by any process well known in the art.

Figure 1:
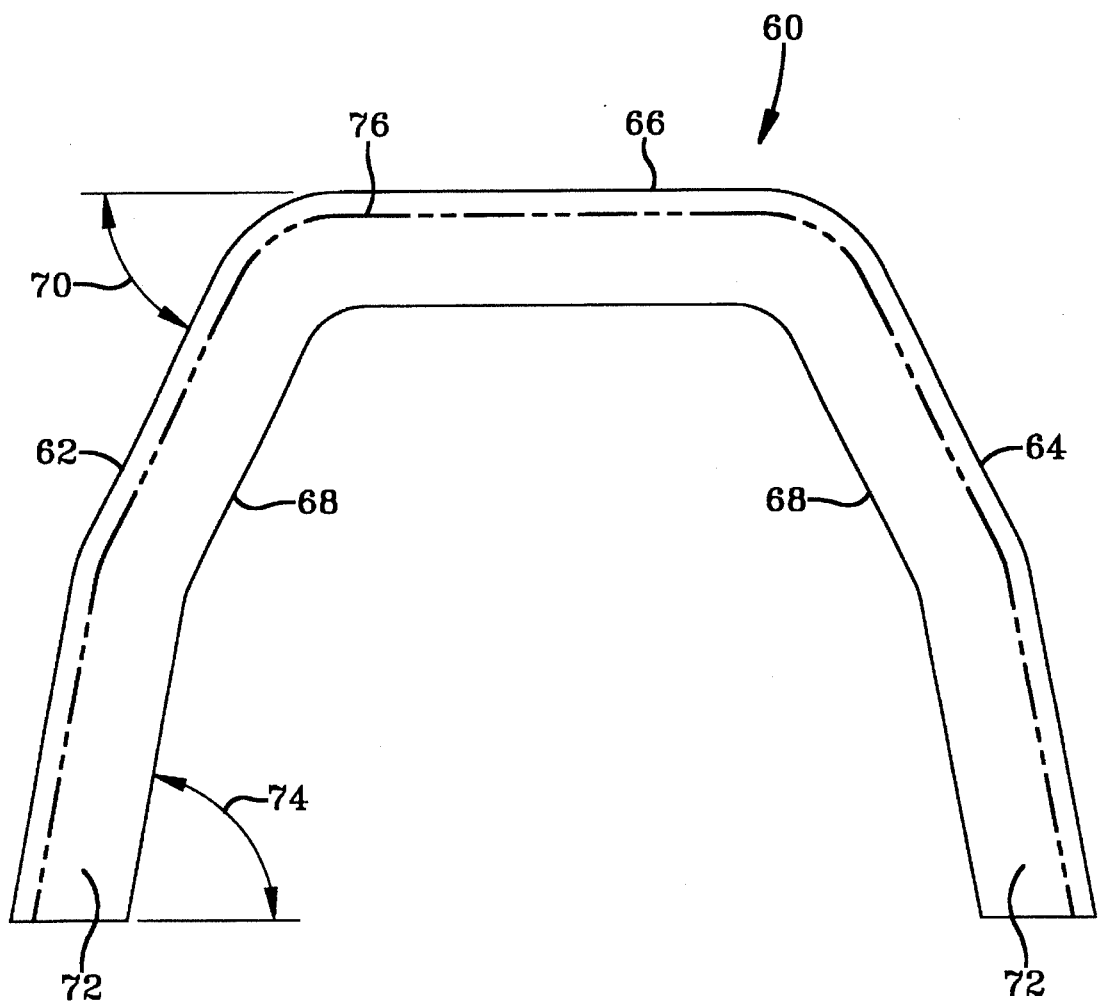
FIG. 1 is a side view of a core bar insert.

In the optional configuration, core bar inserts are fabricated into the track as part of the manufacturing process. The core bar insert 60 has a shape such as shown in FIG. 1 and is made of a hard material. In a preferred embodiment, each core bar insert 60 is made from an ultrahigh molecular weight plastic such as polyethylene. Each core bar insert 60 has a modified U-shape. Two legs 62, 64 extend downward from a head 66 of each core bar insert 60. Each leg is inclined at an angle of from 50°–85° degrees from the top surface. In a preferred embodiment, such as shown in FIG. 1, the legs of the core bars are formed by compound angles. Each leg has a first or upper portion 68 which is inclined at an angle 70 of about 50°–75° from head 66. The lower portion 72 of each leg is inclined at an angle 74 which is greater than angle 70, and preferably of from about 70°–85° from head 66.

Legs 62, 64 and a portion of head 66 of each core bar insert 60 are embedded in the elastic rubber track. A portion of core bar insert head 66 is not embedded in the elastic rubber track and forms anti-detracking protrusion 76 which extends from the inner circumferential surface of the rubber track. Optionally, portions of the core bar legs may extend outward from the track. That is to say, the edges of the legs 62, 64 may be exposed while a substantial portion of the legs are embedded in the rubber track, as shown by the dashed lines in FIG. 1. An example of a core bar insert may be found in U.S. Pat. No. 5,295,741, incorporated herein by reference. The major difference between the core-bar insert 60 of the present invention and prior art core bar inserts is the configuration of core bar insert 60. Prior art core bar inserts are held in place by wings which are embedded in the elastomeric track material. The result is that the core bar insert shape is complex, while the size is large relative to the track. This prior art core bar insert can be very heavy when the material of construction is an iron-based alloy. Alternatively, when the material of construction is a lightweight material, for example polyethylene, the wings are fragile and are easily overloaded in their thin sections. Core bar inserts 60 of the present invention are positioned in the rubber track by legs 62, 64 extending into the elastomeric track material. The angles 70 and 74 formed by the legs are sufficient to assure that the core bar inserts are captured by the track and held in place by friction between the rubber of the track and the material of the insert. Among the benefits are more flexibility in choosing the materials of construction for the core bar inserts. Additionally, because of their simpler configuration, core bar inserts 60 of the present invention are cheaper and easier to manufacture and assemble into the track, as will become evident. In a preferred embodiment, an ultrahigh molecular weight plastic such as polyethylene, is the preferred material of construction for core bar insert 60.

The track, typically including core bar inserts 60, is prepared in a novel and unconventional manner. At least two mold assemblies are required for the preparation of the track.

Figure 2:
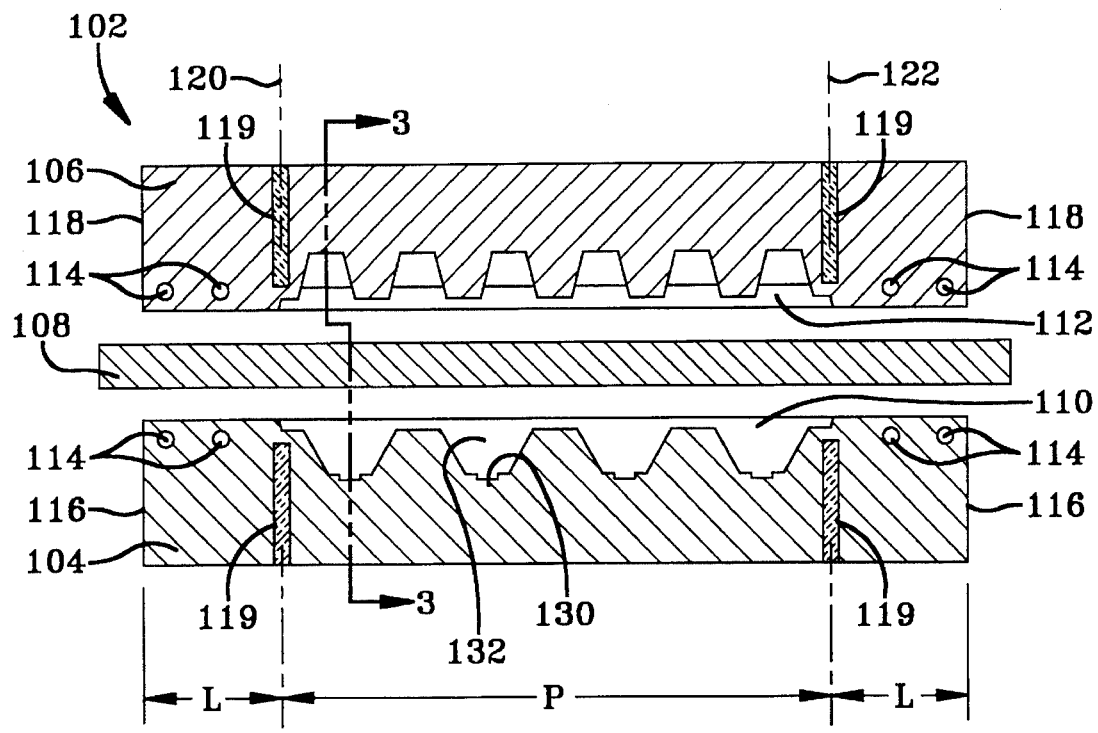
FIG. 2 is a side cross-sectional view of the first mold assembly.

Referring now to FIG. 2, the first mold assembly 102 is comprised of a pair of mold halves, an inner mold half 104, an outer mold half 106 as well as a removable subplate 108. Inner mold half 104 is a pattern which will form the interior portions of a segment of the rubber track. That is, when material fills inner mold half cavity 110, the material will have the shape of the rubber track interior portion, also referred to as the sprocket engaging surface. Outer mold half 106 is a pattern which will form the exterior portion of a segment of the rubber track, also referred to as the treaded surface. That is, when material fills the outer mold half cavity 112, the material will have the shape of the rubber track exterior portion. Removable subplate 108 is a substantially flat plate which is positioned between mold halves 104, 106 and preferably which has a surface finish smoother than either of mold halves 104, 106. Mold halves 104, 106 include cooling channels 114 positioned between mold ends 116, 118 and insulation 119 located at interior positions 120, 122, the centerlines of which are shown as dotted lines located at a preselected inboard location from mold ends 116, 118. Cooling channels 114 and insulation 119 are provided so that cooling water may be circulated to keep the mold halves cool from the mold ends 116, 118 to the interior positions, as will be discussed. The insulation prevents the cooling water from adversely affecting the portion of the track between the dotted lines 120, 122.

Figure 3:
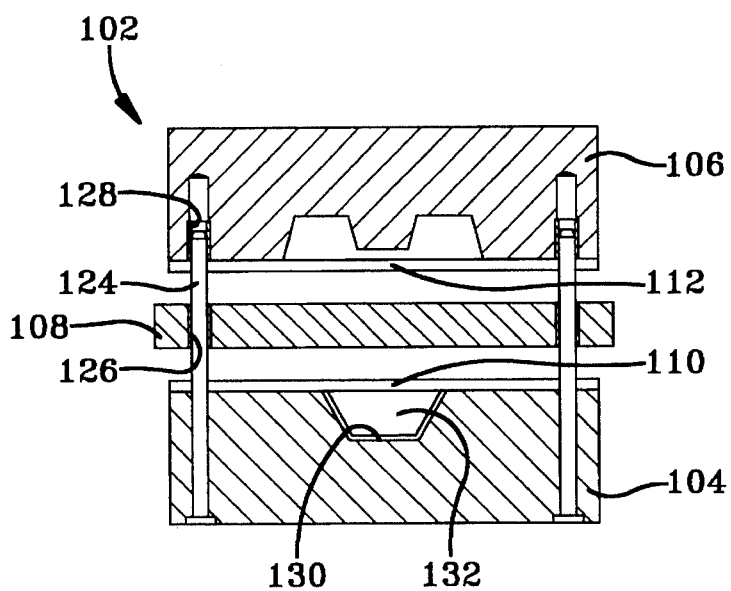
FIG. 3 is a sectional view of the first mold assembly along lines 3—3 of FIG. 2.

Mold assembly 102 also include positioning means to properly locate inner mold half 104 in relation to outer mold half 106. Referring to FIG. 3, inner mold half 104 includes pins 124 which pass through apertures 126 in subplate 108 and extend into bores 128 in outer mold half 106. It is understood that the pin/aperture/bore 124/126/128 system is but one positioning means for locating the inner mold half 104, outer mold half 106, and subplate 108. Any other suitable system for locating these elements in proper relation to one another may be used. Inner mold half further includes notches 130, one notch 130 being present in each lug cavity 132. Notch 130 is dimensioned to receive at least the head 66 of core bar insert. Notch 130 extends about 1–20 millimeters, and preferably from 1–2 millimeters, inward from the bottom of lug cavity 132.

Figure 4:
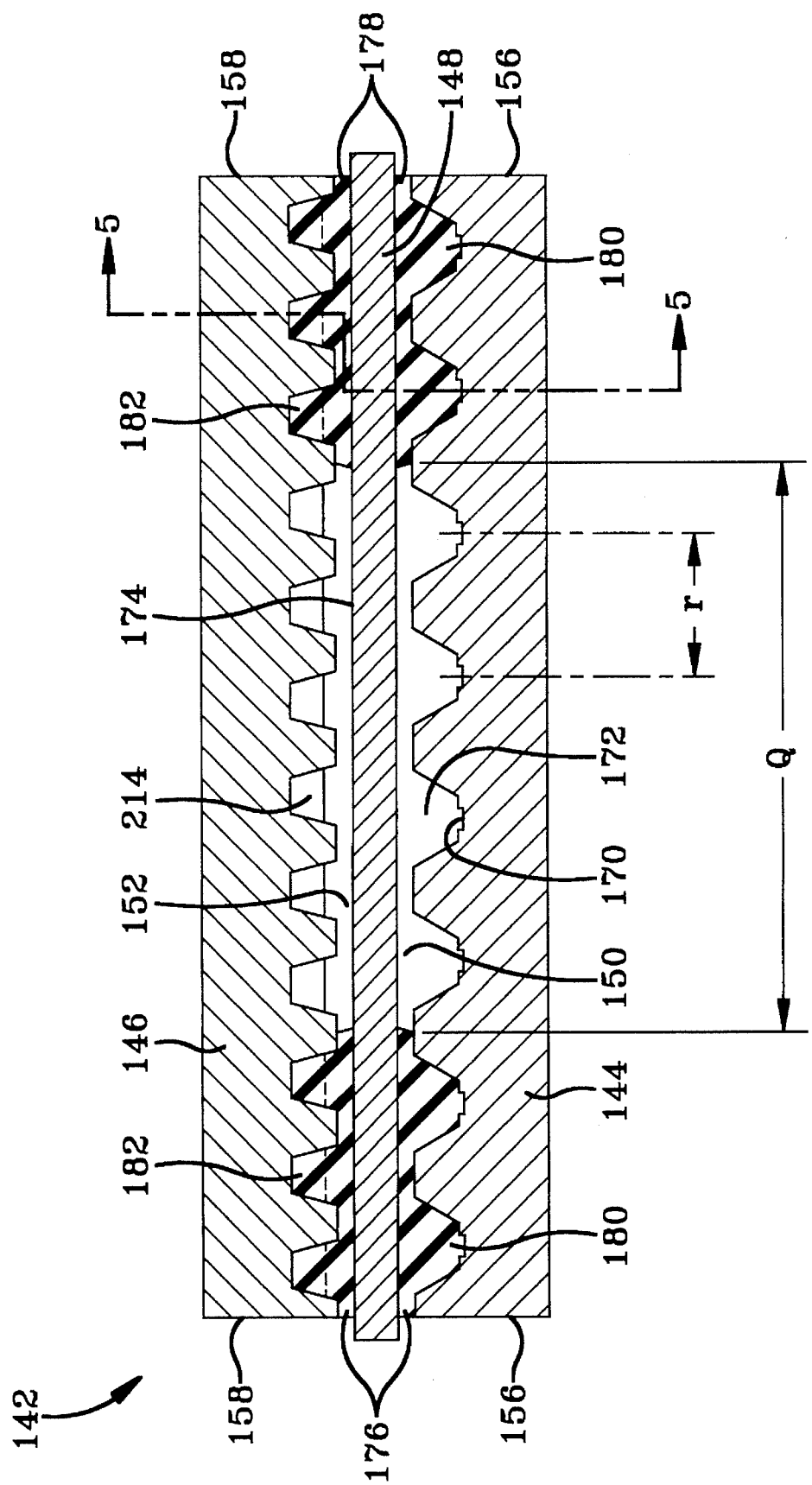
FIG. 4 is a side cross-sectional view of the second mold assembly.

Referring now to FIG. 4, the second mold assembly 142 is comprised of a pair of mold halves, an inner mold half 144 an outer mold half 146 and a removable subplate 148. Inner mold half 144 is a pattern which will form the interior portions of a segment of the rubber track. That is, when material fills inner mold half cavity 150, the material will have the shape of the rubber track interior portion.

Outer mold assembly 146 is a pattern which will form the exterior portion of a segment of the rubber track. That is, when material fills the outer mold half cavity 152, the material will have the shape of the rubber track exterior portion.

Removable subplate 148 has a surface finish which is smoother than either of mold halves 144, 146. Subplate 148 has a central portion 174 with a preselected length Q which is a substantially flat plate. Subplate 148 also has two outboard or end portions 176, 178. Each of these subplate portions 176, 178 has an inner portion 180 having the configuration of the interior, or sprocket engaging, portions of a rubber track segment and an outer portion 182 having the configuration of the exterior, or treaded surface, portion of a rubber track segment. These subplate outboard portions extend from mold ends 156, 158 to the central portion 174, a distance at least as great as, and preferably greater than the distance from mold ends 116, 118 to interior portions 120, 122 of inner mold half 104 and outer mold half 106 of first mold assembly 102. Each subplate outboard or end portion 176, 178 extends for a distance greater than ¼ of a pitch, and in a preferred embodiment, from 1–2 pitches of the rubber track interior portion, each pitch being equal to the distance between the centers of adjacent lugs, shown as r in FIG. 4. Subplate outboard or end portions 176, 178 fill inner mold half cavity 150 and outer mold half cavity 152 for a length as great as or greater than the length L, and preferably for 1–2 pitches of the interior portion of the rubber track, as shown in FIG. 4 when removable subplate 148 is assembled to mold half cavities 150, 152 of second mold assembly 142. Thus, in the preferred embodiment each of the outboard or end portions of the rubber track extends for a length of 1–2r, where r is one pitch of the interior portion of the rubber track. Subplate portions 176, 178 may be manufactured as portions of subplate 148, for example, aluminum or machined tool steel. In a preferred embodiment, subplate portions 176, 178 are manufactured from vulcanized butyl rubber and assembled onto metallic subplate 148. A butyl rubber composition is preferred since, upon application of heat, it will expand to completely seal lug cavities 172 and tread cavities 214 without damaging the mold. Additionally, the butyl rubber is easily removable and replaceable as it wears and ages.

Figure 5:
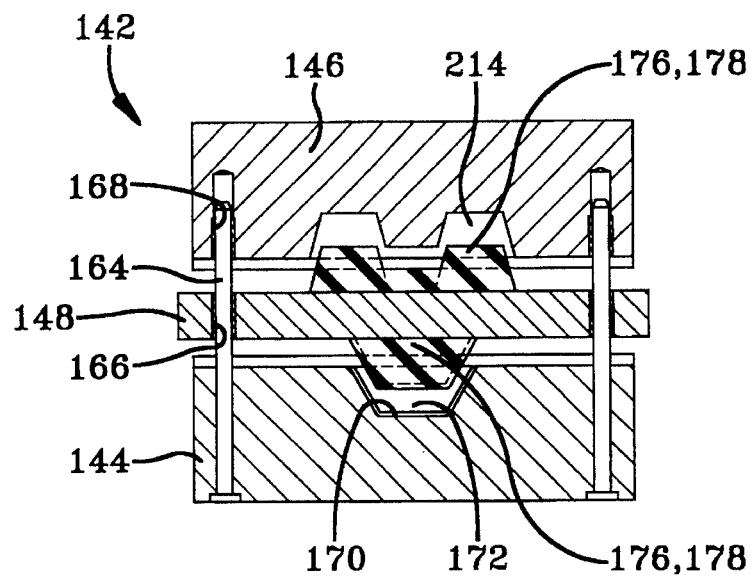
FIG. 5 is a sectional view of the second mold assembly along lines 5—5 of FIG. 4.

Referring now to FIG. 5, mold assembly 142 also include positioning means to properly locate inner mold half 144 in relation to outer mold half 146. Inner mold half 144 includes pins 164 which pass through apertures 166 in subplate 148 and extend into bores 168 in outer mold half 146. It is understood that the pin/aperture/bore 164/166/168 system is but one positioning means for locating mold halves 144, 146, in relation to subplate 148 and to each other. Any other suitable system for locating these elements in proper relation to one another may be used.

Referring back to FIG. 4, inner mold half further includes notches 170, one notch 170 being present in each lug cavity 172. Notch 170 is dimensioned to receive core bar insert head 66 and legs. Notch 170 extends about 1–20 millimeters, and preferably 1–2 millimeters, inward from the bottom of lug cavity 172.

Figure 6:
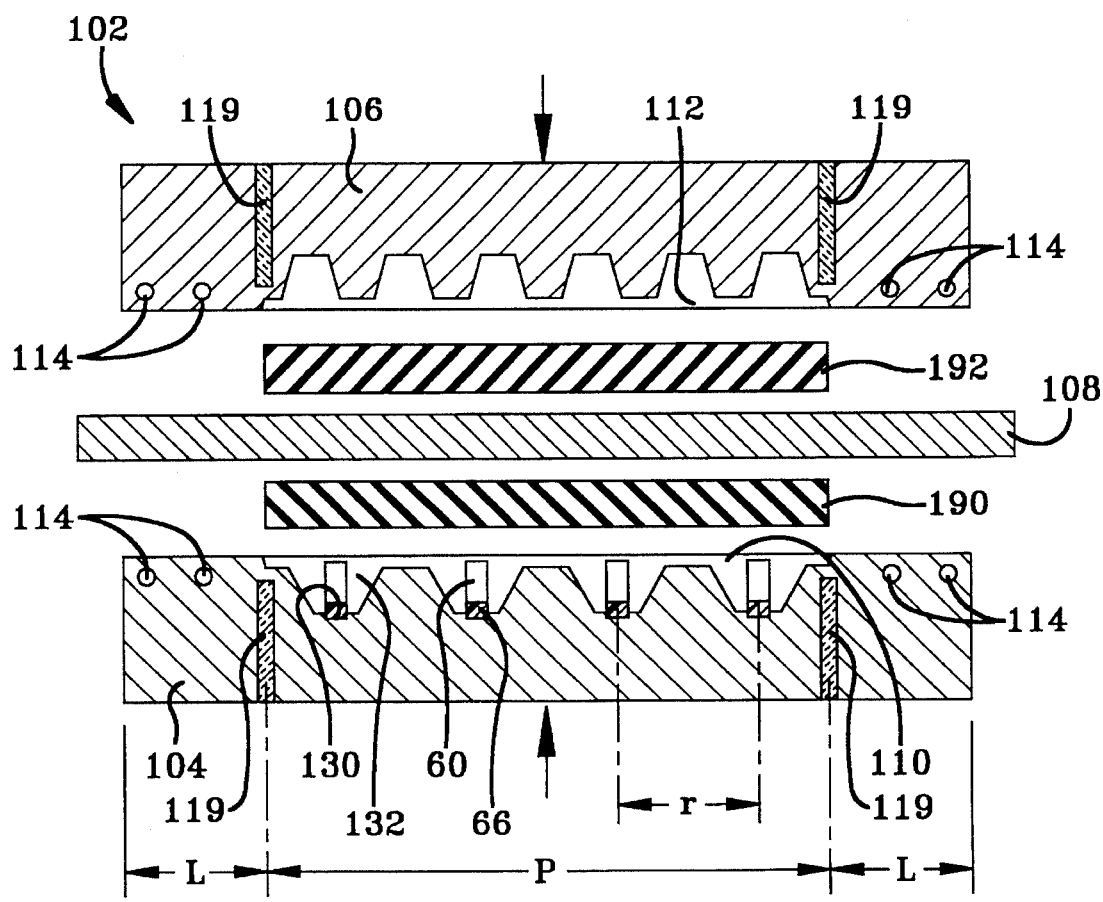
FIG. 6 is a side cross-sectional view of the first mold assembly with green rubber slugs positioned above and below the subplate prior to molding.

Using first mold assembly 102 and second mold assembly 142, track is prepared in the following manner. Referring now to FIG. 6, core bar inserts 60 are inserted so that heads 66 are positioned in notches 130 of lug cavities 132 of inner mold half 104. A first green rubber slug 190 is positioned in inner mold cavity half 110. There is sufficient rubber in green rubber slug 190 to completely fill inner mold half cavity 110. Subplate 108 is positioned over first green rubber slug 190, utilizing positioning means. A second green rubber slug 192 is positioned over subplate 108. Outer mold half 106 is positioned over second rubber slug 192 utilizing positioning means. Sufficient rubber is present in second rubber slug 192 to completely fill outer mold half cavity 112.

The amounts of rubber utilized in green rubber slugs 190, 192 are obtained by determining the volume of rubber required for the respective mold half cavities 110, 112. Then, by carefully weighing the rubber, the proper amount of green rubber for rubber slugs 190 and 192 can be provided with very little overage or waste, which, if present, can be readily removed.

The first mold assembly 102, with rubber slugs 190, 192 inserted therein, is heated to an elevated temperature in the range of 50°–140° C. which is sufficient to cause the rubber to soften. However, the temperature is not so high so that the rubber will vulcanize. This temperature may be achieved by any conventional techniques, such as by providing electrical resistance heaters within the mold or placing the rubber mold assembly in an oven held at a temperature of 50°–140° C., although the preferred method is introducing steam into steam channels built into the mold assembly (not shown) as is well known in the art. Pressure in the range of about 100–300 kilopascals (about 14–50 psi) is also applied perpendicular to mold halves 104, 106 substantially in the direction of the arrow as shown in FIG. 6. The heat and pressure applied to mold assembly 102 are sufficient to cause green rubber slugs 190, 192 to flow and fill mold half cavities 110, 112. After the green rubber is flowed into the mold, taking the shape of the mold cavities, and preferably, while mold assembly 102 is still hot, inner mold half 104 and outer mold half 106 are separated so that subplate 108 can be removed. Because subplate 108 has a smoother surface finish than either of mold halves 104, 106, the green rubber will remain in the mold halves, allowing easy separation of removable subplate.

Figure 7:
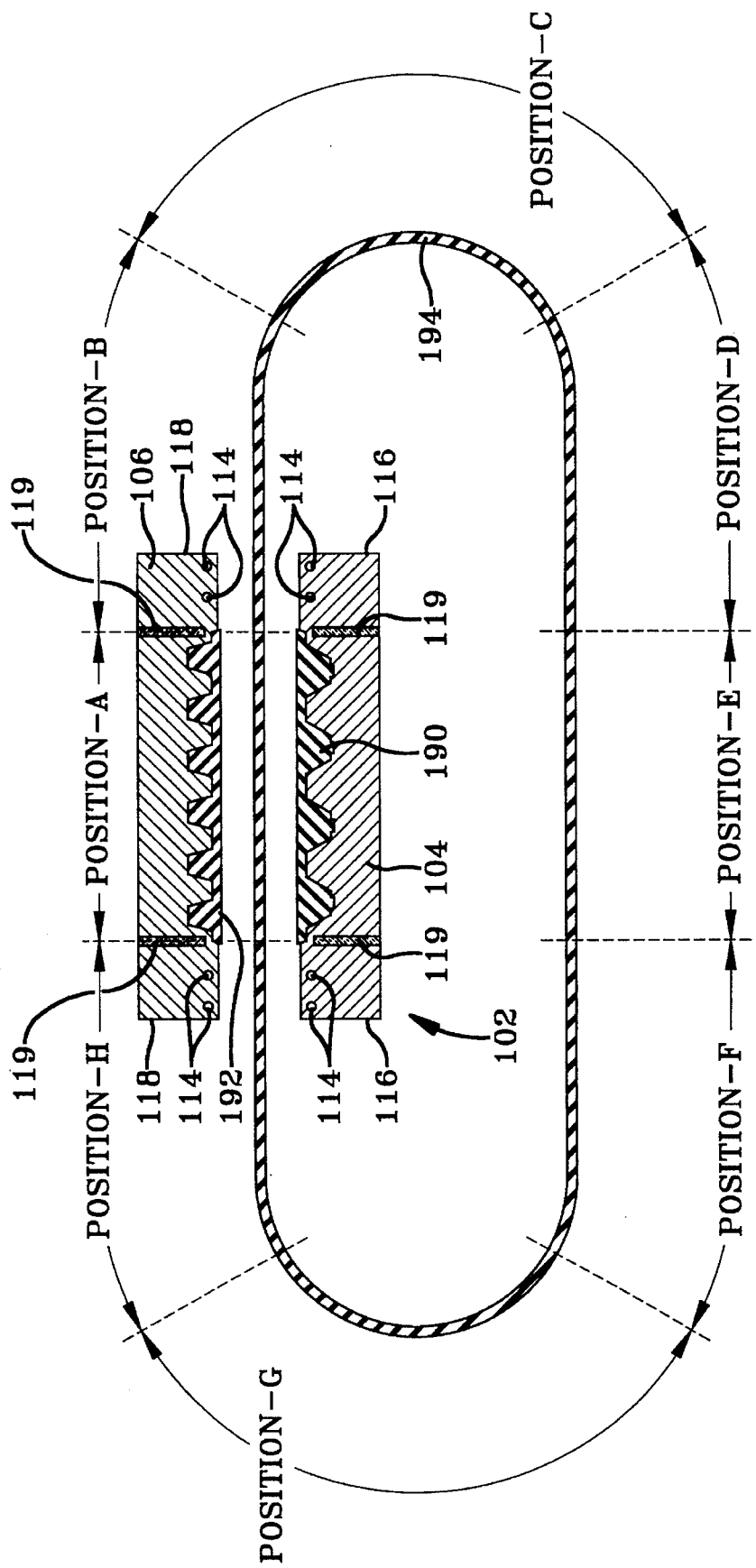
FIG. 7 is a view of a green rubber belt positioned between the mold halves of the first mold assembly, the green rubber belt being viewed on edge, and the mold halves shown in cross-section positioned on either side of the belt.

Referring now to FIGS. 2 and 7, a green belt 194 is placed between inner mold half 104 and outer mold half 106 of first mold assembly 102, which now has green rubber filling the mold cavities. The longitudinal axis of the first mold assembly is parallel to the length of the belt in the region of interest, the belt being viewed on edge in FIG. 7. The mold halves are properly located utilizing positioning means as previously discussed, and the rubber containing mold halves are closed about green belt 194, preferably while the molded green rubber is still hot. The initial placement of green belt 194 between the mold halves is at an arbitrary position A as shown in FIG. 7. Cooling water is then supplied to cooling channels 114. The temperature of the assembly is now raised to an elevated temperature sufficient to vulcanize the rubber in the mold assembly and the belt while pressure is applied. The temperature is in the range of 145°–180° C., and preferably 155–°165° C. However, the cooling water in cooling channels 114 is adjusted so that rubber is not vulcanized between mold ends 116, 118 and insulation 119 for a distance L in both the inner mold half and outer mold half 106. Length L extends for a distance greater than or equal to ¼r, and preferably, preselected length L extends from the mold end to the insulation for a length of 1r to 2r, where r is one pitch of the rubber track interior portion. A thin region of partially vulcanized (partially cross-linked) rubber may occur in the vicinity of insulation 119. However, the rubber is fully vulcanized in the first mold assembly between interior positions 120 and 122. The amount of cooling water required will depend on the size of the mold assembly and the actual temperature at which vulcanization will be performed. However, as is apparent to one skilled in the art, the required cooling water flow can be determined for each mold design at a selected vulcanization temperature. The result is a rubber track segment 196 at position A which is vulcanized between interior positions 120 and 122, but which is still green for a length L at exterior positions from 116 to 120, 116 to 122, 118 to 120 and 118 to 122.

Figure 8:
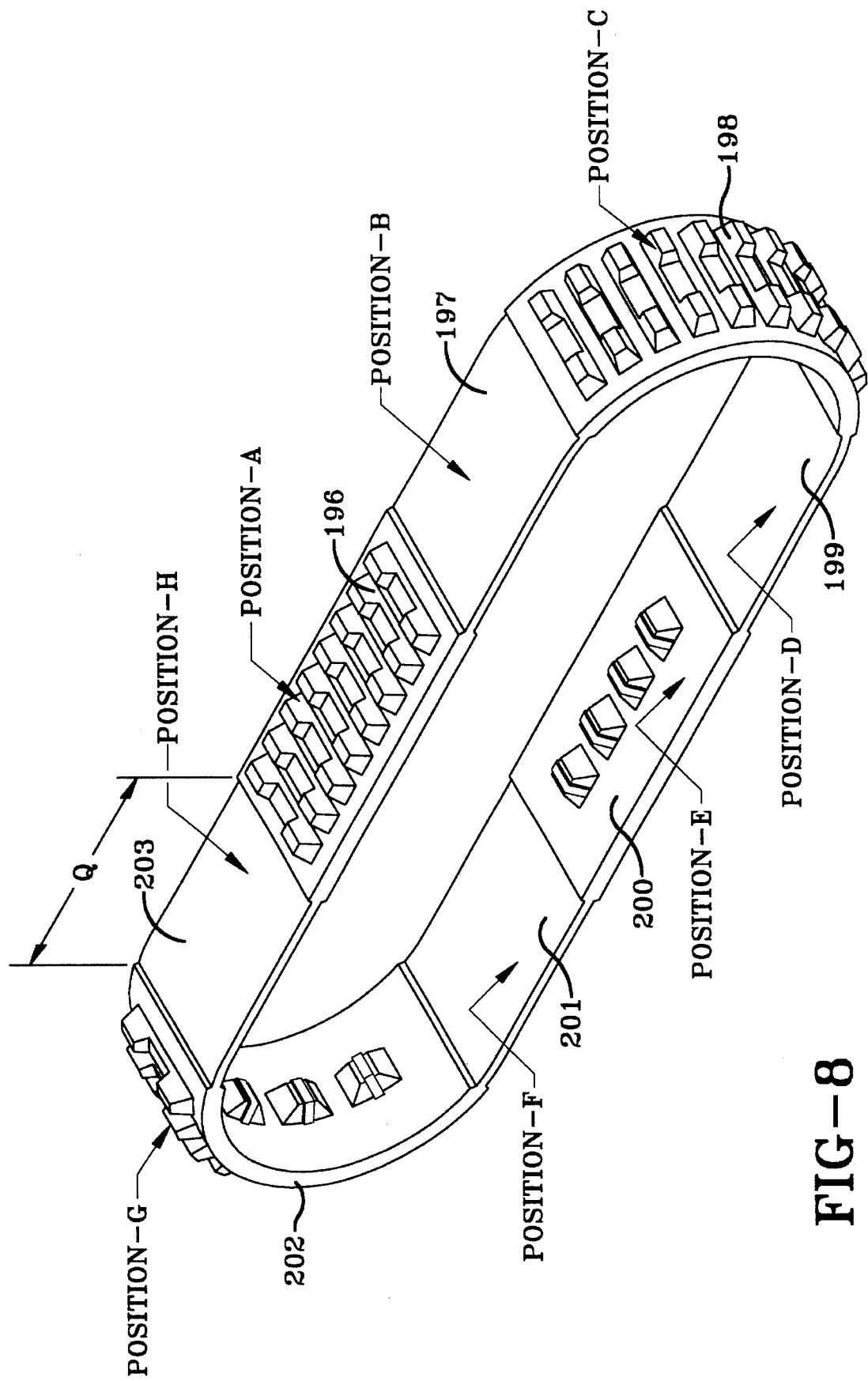
FIG. 8 is a schematic of a partially completed endless track.

Once Position A is established, the above procedure utilizing first mold assembly is repeated at positions C, E and G, as illustrated in FIG. 8, so that a belt segment having a plurality of vulcanized portions, shown at positions A, C, E and G, and adjacent green portions, shown at positions B, D, F and H, is formed, the respective belt segments indicated as 196, 198, 200 and 202. Each segment is separated from the other segments by a preselected distance Q equal to the length of the central portion 174 of subplate 148. It will be understood by those skilled in the art that although the procedure is repeated four times in the illustrated example, the procedure may be successfully employed by dividing the track into fewer or more sections, as desired.

Belt positions B, D, F and H as illustrated in FIG. 8, are, at this point, simply green belt segments with no tread. The green belt segments 197, 199, 201, 203 at positions B, D, F and H have the same length as the central portion 174 of removable subplate 148 of second mold assembly 142.

Figure 9:
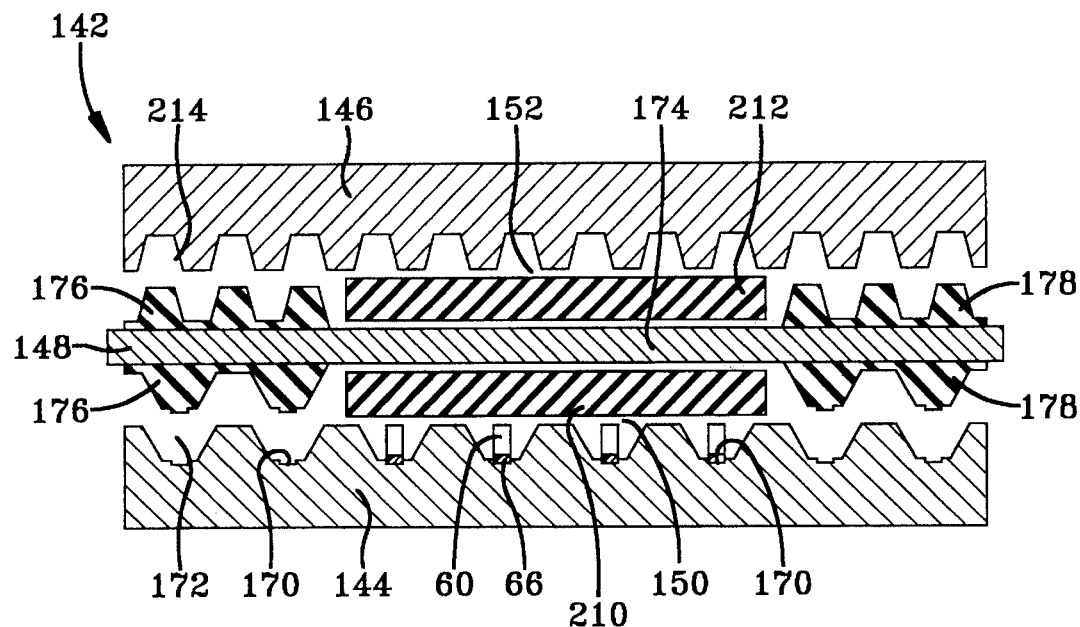

Rubber track segments are provided for belt positions B, D, F and H in the following manner. Referring now to FIG. 9, core bar inserts 60 are inserted into inner mold half 144 so that heads 66 are positioned into notches 170 of lug cavities 172. A third green rubber slug 210 is positioned in inner mold half 144. Subplate 148 is positioned over green rubber slug 210 utilizing positioning means so that green rubber slug 210 is positioned in inner mold half cavity 150 between subplate outboard or end portions 176, 178 and under central portion 174 utilizing positioning means. There is sufficient rubber in green rubber slug 210 to completely fill inner mold half cavity 150 between subplate outboard or end portions 176, 178. A fourth green rubber slug 212 is positioned over subplate central portion 174. Outer mold half 146 is positioned over fourth rubber slug 212 utilizing positioning means so that rubber slug is positioned in outer mold half cavity 152 between subplate outboard or end portions 176, 178. There is sufficient rubber in rubber slug 212 to completely fill outer mold half cavity 152 between subplate outer portions 176, 178. The amounts of rubber utilized in green rubber slugs 210, 212 are determined in the same manner as the amount of rubber used in green rubber slugs 190, 192.

Figure 9A:
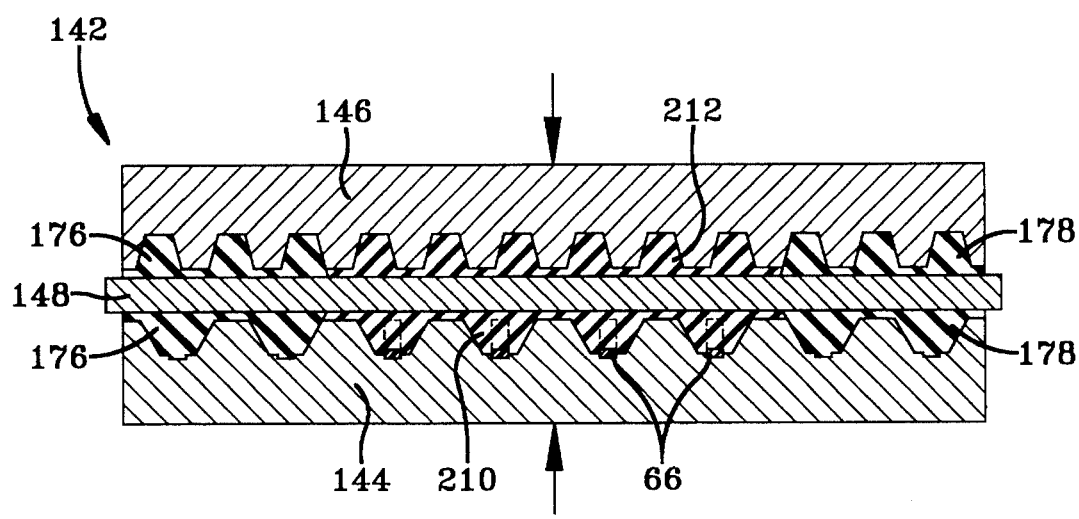
FIG. 9A is a side cross-sectional view of the same second mold assembly after molding.

The second mold assembly 142, with rubber slugs 210, 212 inserted therein, is heated to an elevated temperature in the range of 50°–140° C. which is sufficient to cause the rubber to soften. However, the temperature is not so high so that the rubber will vulcanize. This temperature may be achieved by any conventional techniques, such as by providing electrical resistance heaters within the mold or placing the rubber mold assembly in an oven at a temperature in the range of 50°–140° C., although the preferred method is introducing steam into steam channels built into the mold assembly (not shown). Pressure is also applied perpendicular to mold halves 144, 146 substantially in the direction of the arrows as shown in FIG. 9. The heat and pressure applied to mold assembly 142 are sufficient to cause green rubber slugs 210, 212 to flow and fill mold cavities 150, 152. The subplate outboard or end portions 176, 178 extend into lug cavities 172 and tread cavities 214 so as to prevent the flow of the softened rubber into the mating portions of the inner and outer mold halves 144, 146, as shown in FIG. 9A. After the green rubber has taken the shape of the mold cavities adjacent subplate central portion 174, and preferably, while mold assembly 142 is still hot, inner mold half 144 and outer mold half 146 are separated so that subplate 148 can be removed. The surface roughness of mold halves 144, 146 facilitates the removal of smooth subplate 148 without disturbing rubber in cavities in the mold halves.

Figure 10:
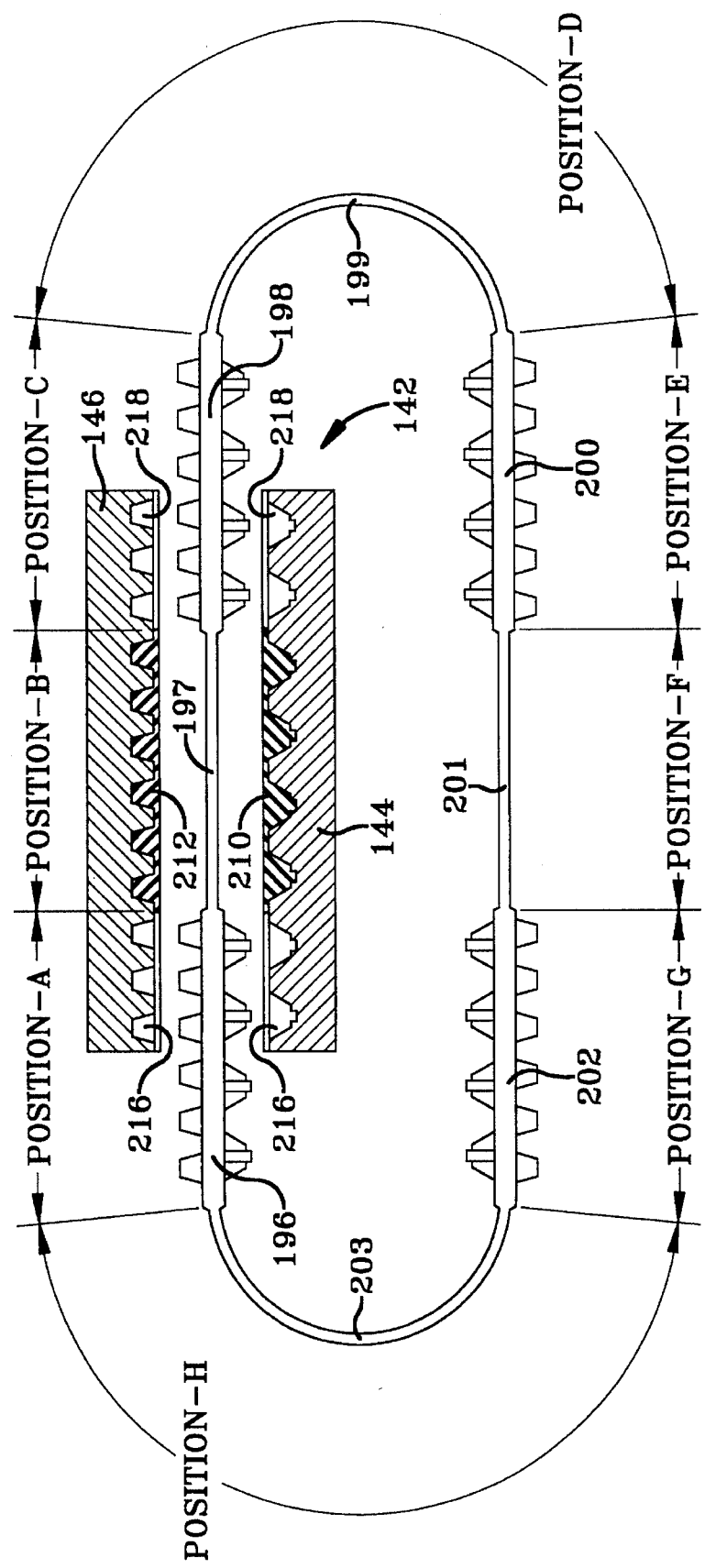
FIG. 10 is a view of a partially completed endless track viewed on its edge with the second mold assembly in position on either side of the track prior to final molding and vulcanization.

Referring now to FIG. 10, a green belt segment, for example segment 197, located at position B is placed between inner mold half 144 and outer mold half 146 of second mold assembly 142. Second mold assembly 142 includes green rubber filling the mold cavities which were adjacent subplate central portion 174. However, mold cavities 216, 218, which were adjacent subplate outboard or end portions 176, 178, are empty. As inner mold half 144 and outer mold half 146 close about green belt segment 197, inner and outer mold half assemblies 144, 146 overlap portions of adjacent rubber track segments, rubber track segment 196 at Position A and rubber track segment 198 at Position C. Empty cavities 216, 218 of inner and outer mold half assemblies 144, 146 capture end portions of each of rubber track segments 196, 198.

As can be seen by reference to FIGS. 2, 4 and 10, empty mold cavities 216, 218 which extend for a length greater than length L on either side of filled mold cavities of mold assembly 142, capture unvulcanized portions of rubber track segments 196, 198, which extend a distance L, preferably about 1 to 2 pitches of the inner mold assembly, as well as adjacent vulcanized portions of rubber track segments 196, 198.

The cavities of mold assembly 142 now capture all of the remaining green or unvulcanized rubber as well as the green belt between the inner and outer mold halves. Immediately adjacent to the captured green rubber, at either end a portion of vulcanized rubber is also captured. The temperature of mold assembly 142 is then raised to a temperature sufficient to vulcanize the green rubber in mold assembly 142 and green belt positioned between inner and outer mold halves 144, 146, while pressure is applied. The temperature is in the range of 145°–180° C., and preferably from 155°–165° C. The pressure is held in the range of 100–300 kilopascals. As the green rubber is vulcanized at elevated temperature and pressure, the vulcanized rubber captured at either end of the mold assembly 142 acts as packing to prevent movement or flow of the green rubber during the curing operation. After the rubber is vulcanized, the inner and outer mold halves are removed and the operations utilizing mold assembly 142 are repeated for green belt segments 199, 201, 203 at positions D, F and H. Upon completion, a fully vulcanized endless rubber track is produced.

Figure 11:
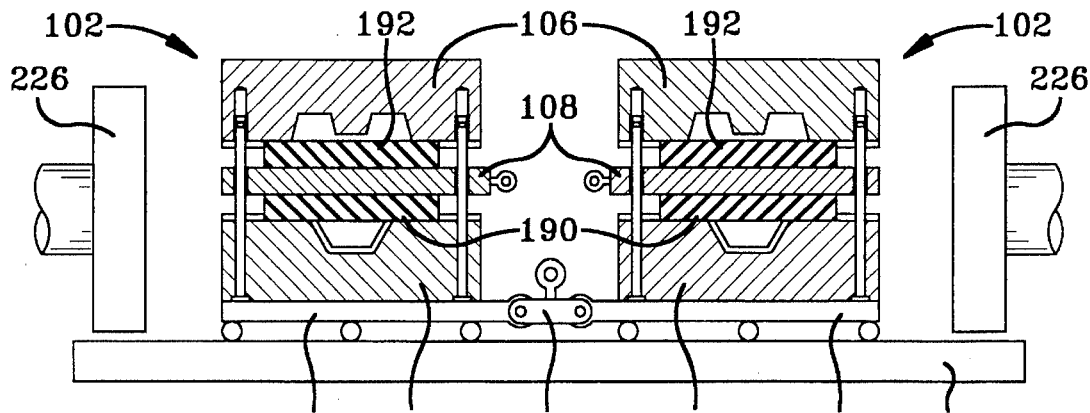
FIG. 11 is a cross-sectional view, viewed along the longitudinal axis of the assembly, of a preferred embodiment of the first mold assemblies of the present invention, loaded with rubber slugs, the molds being in a horizontal position.
Figure 12:
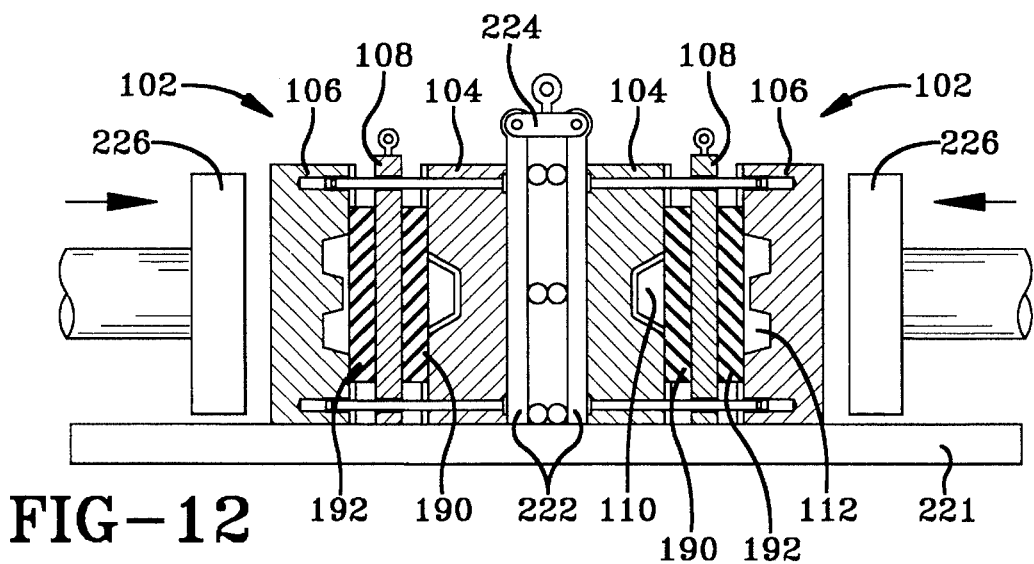
FIG. 12 is a cross-sectional view, viewed along the longitudinal axis of the assembly, of a preferred embodiment of the first mold assemblies of the present invention, loaded with rubber slugs, the molds having been pivoted 90° from their prior horizontal position.
Figure 13:
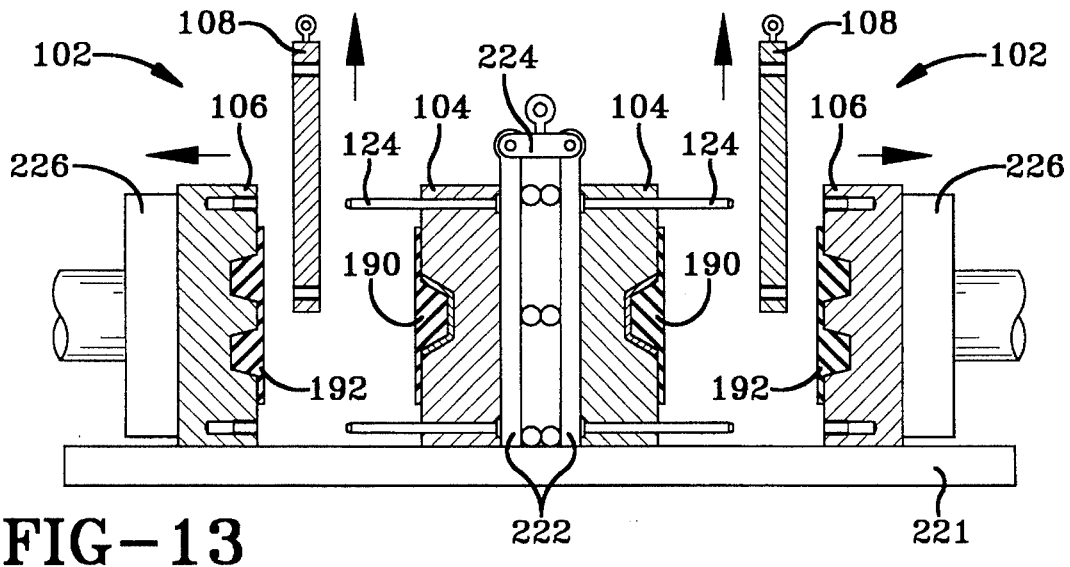
FIG. 13 is a cross-sectional view, viewed along the longitudinal axis of the assembly, of a preferred embodiment of the first mold assemblies of the present invention, with molded green rubber, in a vertical position with mold halves retracted and subplates removed.

A preferred system for manufacturing rubber track, referred to as the dual press system, utilizes two pair of presses to manufacture an endless rubber track. Referring to FIG. 11, a pair of first mold assemblies 102 is viewed in cross section along the longitudinal axis of the assembly, that is the longitudinal axis of the assembly runs into and out of the plane of the Figure. The assemblies are each loaded with first green rubber slugs 190 and second green rubber slugs 192 and shown positioned horizontally on a support 221. Each inner mold half 104 includes arms 222 which are connected to a pivot means 224 such as a pivot pin. After first green rubber slugs 190 are loaded into inner mold half 104 by a slug server, not shown, removable subplates 108 are positioned over slugs 190. Second green rubber slugs 192 are loaded onto subplates 108 by a slug server and outer mold halves 106 are positioned over slugs 192. The assemblies are then pivoted 90° about pivot means 224 so that first mold assemblies are in a vertical position on support 221 as shown in FIG. 12. Pressure is then applied by press means 226, such as for example, hydraulic presses, in a horizontal direction perpendicular to the faces of outer mold halves 106 and along the mold longitudinal axis as shown in FIG. 12, while heat is applied to first mold assemblies 102 to cause the green rubber to flow in accordance with the method previously set forth. The molds are then opened and subplates 108 are removed, for example, with an overhead lifting device as shown in FIG. 13.

Figure 14:
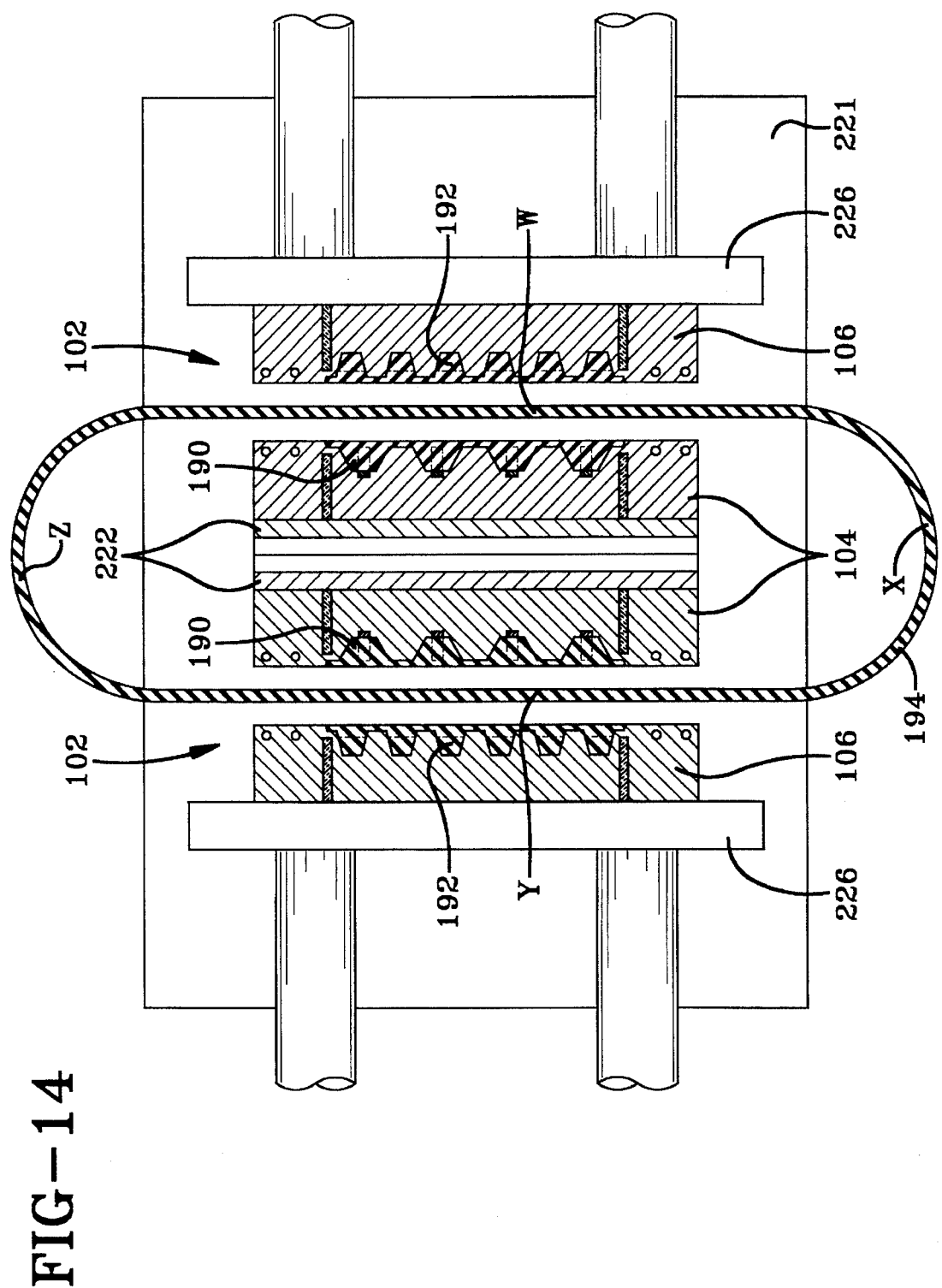
FIG. 14 is a view of a preferred embodiment of the present invention with a green rubber belt positioned between the mold halves of a pair of first mold assemblies, the green rubber belt being shown on edge.
Figure 15:
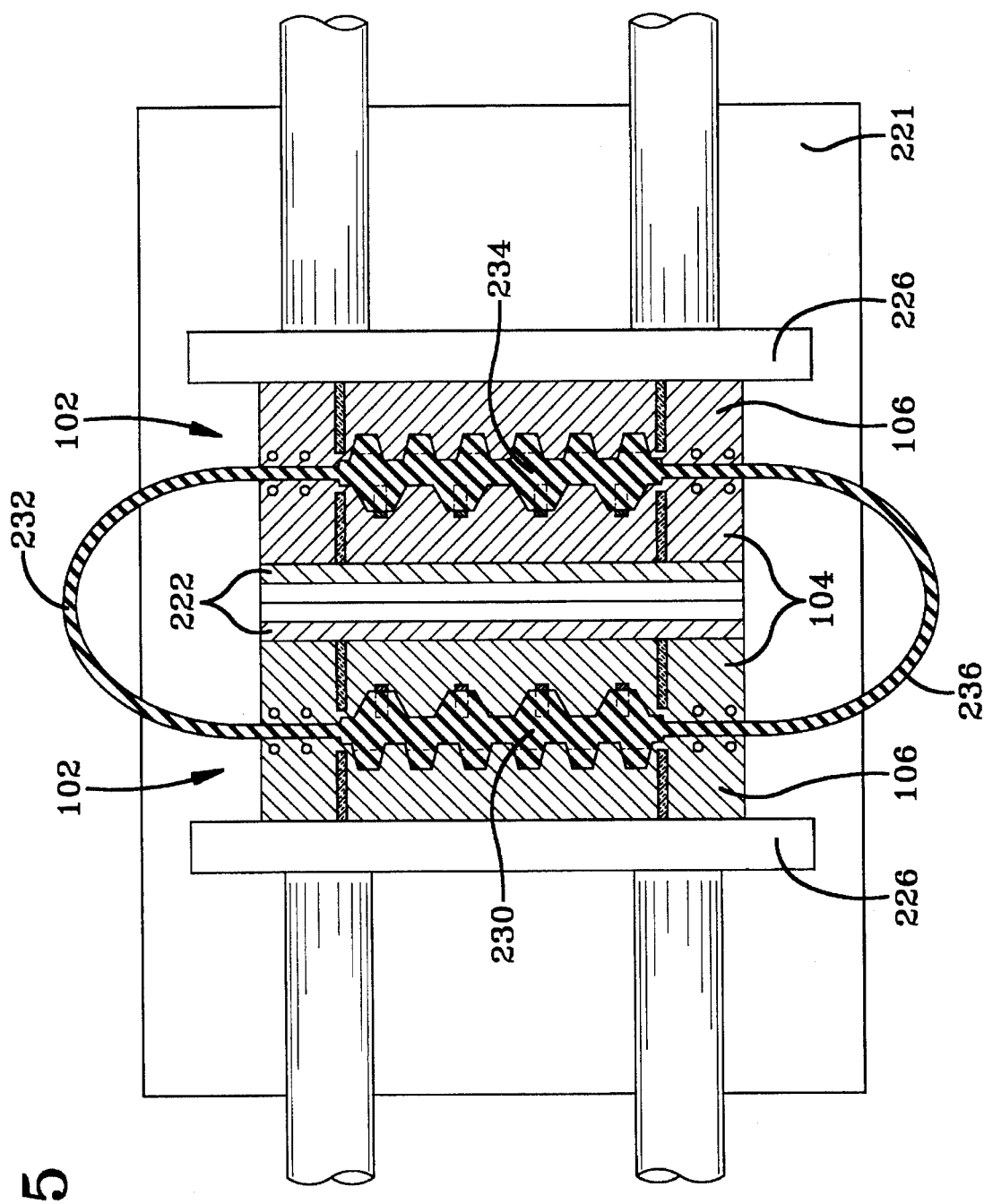
FIG. 15 is a view of a green rubber belt positioned between the mold halves of a pair of first mold assemblies filled with molded green rubber, the mold assemblies shown in cross-section and the green rubber belt being shown on edge.
Figure 16:
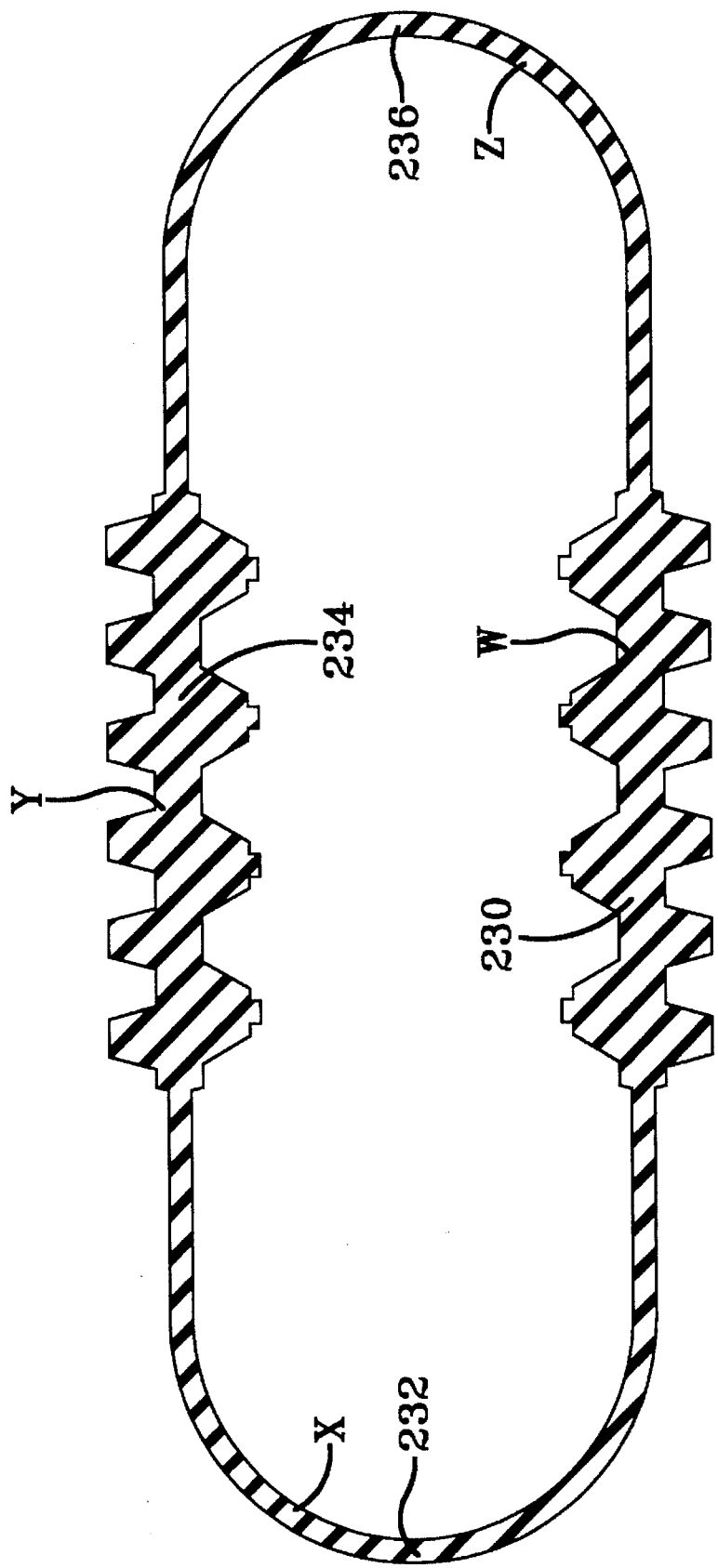
FIG. 16 is a view of the partially completed rubber track of FIG. 15 with two segments positioned opposed to one another, the green belt being shown on edge.

Referring now to FIGS. 14 and 15, green rubber belt 194 is positioned between mold halves 104, 106. In these views, the belt is shown on edge, the belt being parallel to the longitudinal axis of each mold half in the area of interest. The belt may be positioned on a belt holder or hanger which lowers the belt. However other methods for positioning the belt between the mold halves may also be utilized. Once green rubber belt 194 is captured in mold assemblies 102 at positions W, Y, cooling water is applied to mold halves as previously discussed and pressure is applied by hydraulic presses 226 as the temperature is raised, to vulcanize portions of the green rubber between the mold halves as previously discussed, to form rubber track segments at 230, 234. The central portions of the rubber track segments are vulcanized while the outer portions of the rubber track segments are green rubber, as previously discussed. After mold halves 104, 106 are removed, a partially completed track such as shown in FIG. 16 having rubber track segments 230, 234 at positions W, Y and green belt segments 232, 236 at positions X, Z is produced.

Figure 17:
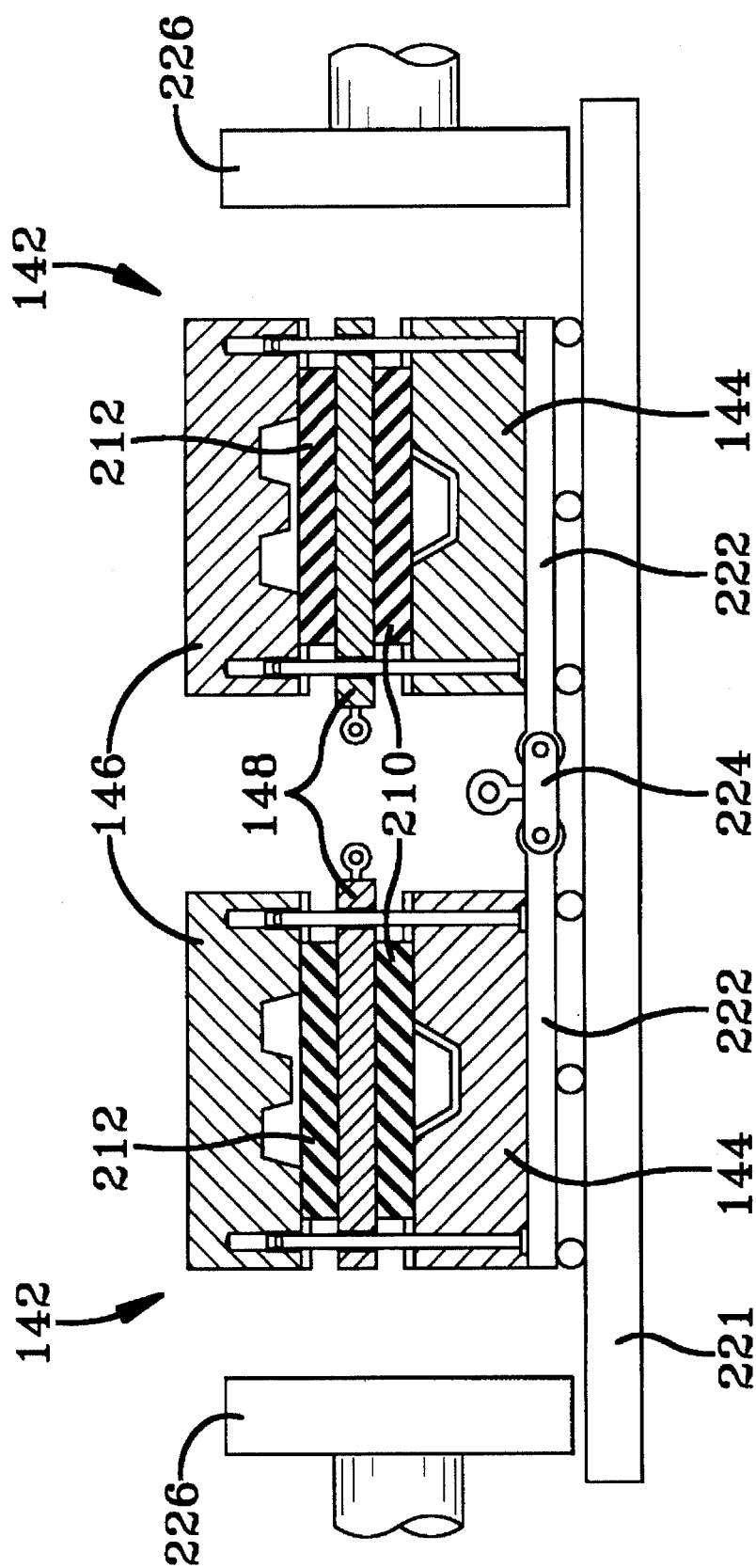
FIG. 17 is a cross-sectional view, viewed along the longitudinal axis of the assembly, of a preferred embodiment of the second mold assemblies of the present invention loaded with green rubber and in a horizontal position.

Rubber track is provided to green belt segments 232, 236 in a similar manner. Referring to FIG. 17, a pair of second mold assemblies 142 is viewed in cross section along the longitudinal axis of the assembly, that is, the longitudinal axis of the assembly runs into and out of the plane of the Figure. The assemblies are loaded with third green rubber slugs 210 and fourth green rubber slugs 212 and shown horizontally positioned on a support 221, which may be the same support depicted in FIG. 11, or may be a separate support. Each of inner mold halves 144 includes arms 222 which are connected to pivot means 224, such as a pivot pin. After third green rubber slugs 210 are loaded into inner mold half 144 by a slug server, removable subplates 148 are positioned over slugs 210. Fourth green rubber slugs 212 are loaded onto subplates 148 by a slug server and outer mold halves 146 are positioned over slugs 212. The assemblies are then pivoted 90° about pivot means 224 so that the second mold assemblies are in a vertical position on support 221 as shown in FIG. 18, wherein the assemblies are shown positioned on the support, with the longitudinal axes of each of the mold assemblies parallel to the mold cavity patterns of the exterior tread cavities and the interior lug cavities. Pressure is then applied by hydraulic presses 226 in a horizontal direction as shown in FIG. 18, while heat is applied to second mold assemblies 142 to cause the green rubber to flow in the manner previously set forth for mold assemblies 142. Subplates 148 are removed, as for example by an overhead crane. See, for example, FIG. 13.

Referring now to FIG. 19, the partially completed track having rubber track segments 230, 234 is positioned so that green belt segments 232, 236 are between inner mold halves 144 and outer mold halves 146. The inner and outer mold halves overlap rubber track segments 230, 234 as previously described for second mold assembly 142. Pressure is applied across the faces of outer mold halves 146 substantially in the direction shown in FIG. 19, forcing inner mold halves 144 together, and temperature in second mold assemblies 142 is raised to vulcanize the green rubber within them. After vulcanization is complete, the mold halves are removed and a completed, vulcanized rubber track is produced.

The invention in its broader aspects is not limited to the specific embodiments shown and described. Departures may be made therefrom without departing from the principles of the invention and without sacrificing its chief advantages.

The invention having been described, what is claimed and desired to be secured by Letters Patent is:

1. A method for producing an endless rubber track, comprising the steps of:

a.) providing a first mold assembly which includes an inner mold half having a cavity patterned in the form of an interior of the rubber track, an outer mold half which mates with the inner mold half having a cavity patterned in the form of an exterior portion of the rubber track, a removable subplate positioned between the inner and outer mold halves, and positioning means for positioning the inner mold half, the outer mold half and the removable subplate in relationship to one another;

b.) placing a first quantity of green rubber adjacent the inner mold half of the first mold assembly, the quantity of rubber being sufficient to fill the inner mold half cavity;

c.) positioning a first side of the subplate of the first mold assembly adjacent to the first quantity of green rubber utilizing positioning means;

d.) placing a second quantity of green rubber adjacent a second side of the subplate of the first mold assembly, the quantity of rubber being sufficient to fill the outer mold half cavity;

e.) positioning the outer mold half of the first mold assembly over the second quantity of green rubber utilizing positioning means;

f.) heating the first mold assembly to an elevated temperature sufficient to soften the first and second quantity of green rubber while applying sufficient pressure to flow the softened rubber into the mold cavities without vulcanizing the rubber; next g.) separating the inner and outer mold halves and removing the subplate while the rubber remains in the inner and outer mold halves of the first mold assembly;

h.) placing a portion of a green belt in the shape of an endless loop between the inner and outer mold halves;

i.) closing the rubber-containing mold halves of the first mold assembly against the green belt portion so that it is sandwiched between the inner and outer mold halves to form an assembly having a central portion of preselected length P and two end portions each having a preselected length L;

j.) applying heat to the first mold assembly to raise the temperature of the green rubber in the central portion of the assembly to a temperature above the vulcanizing temperature of the rubber, while simultaneously maintaining the end portions of the assembly at a temperature below the vulcanization temperature of the rubber, and applying pressure to the assembly to form a rubber track segment with a length P+2L, the rubber track segment having a vulcanized rubber track segment central portion of length P and green rubber track segment end portions each having preselected length L;

k.) removing the mold halves of the first mold assembly from the formed rubber track segment;

l.) repeating steps b–k on the green belt at a distance of Q from the rubber track segment;

m.) providing a second mold assembly which includes an inner mold half having a cavity patterned in the form of an interior of the rubber track, an outer mold half which mates with the inner mold half having a cavity patterned in the form of an exterior portion of the rubber track, a removable subplate having two end portions and a central portion of preselected length Q in the form of a substantially flat plate extending between the end portions, each of the end portions being greater than preselected length L, and further having an inner portion patterned in the form of the interior portion of the rubber track so as to engage a portion of the inner mold half cavity, an outer portion patterned in the form of the exterior portion of the rubber track so as to engage a portion of the outer mold half cavity, the subplate positioned between the inner and outer mold halves, and positioning means for positioning the inner mold half, the outer mold half and the removable subplate in relationship to one another;

n.) placing a third quantity of green rubber adjacent the inner mold half of the second mold assembly, the quantity of rubber being sufficient to fill the inner mold half cavity opposite the central portion of the subplate for the length Q;

o.) positioning a first side of the subplate of the second mold assembly adjacent to the third quantity of green rubber utilizing positioning means;

p.) placing a fourth quantity of green rubber adjacent a second side of the subplate of the second mold assembly, the quantity of rubber being sufficient to fill the outer mold half cavity opposite the central portion of the subplate for the length Q;

q.) positioning the outer mold half of the second mold assembly over the fourth quantity of green rubber utilizing positioning means;

r.) heating the second mold assembly to an elevated temperature sufficient to soften the third and fourth quantities of green rubber while applying sufficient pressure to flow the softened rubber into the central portion of mold cavities having the length Q without vulcanizing the rubber and preventing rubber from flowing into the end portions of the cavities; next s.) separating the inner and outer mold halves and removing the subplate while the rubber remains in the inner and outer mold halves of the second mold assembly;

t.) placing the portion of the green belt having length Q, the green belt located between formed rubber track segments having vulcanized central portions of length P and green rubber end portions of preselected length L, the green belt being located between the central portions of the mold half cavities of the second mold assembly, the cavities being filled with green rubber;

u.) closing the mold halves of the second mold assembly against the green belt portion so that the green belt portion is sandwiched between the central portions of the inner and outer mold halves, and the green rubber track segment end portions of preselected length L formed by the first mold assembly are captured in the end portions of vulcanized rubber track segment central portion P formed by the first mold assembly, the end portion cavities of the second mold assembly having a length greater than preselected length L;

v.) applying heat to raise the temperature of the green rubber in the second mold assembly to a temperature above the vulcanizing temperature of the rubber, while applying pressure to the assembly to form a vulcanized rubber track segment;

w.) removing the mold halves of the second mold assembly from the vulcanized track segment;

x.) repeating steps m–w until an endless vulcanized rubber track is produced.

2. The method of claim 1 wherein the step of heating the first mold assembly to soften the rubber includes heating the mold assembly to a temperature in the range of 50°–140° C.

3. The method of claim 1 wherein the preselected length L is greater than or equal to ¼ of a pitch of the interior portion of the rubber track.

4. The method of claim 1 wherein the preselected length L is between 1 and 2 pitches of the interior portion of the rubber track.

5. The method of claim 1 wherein the step of heating the second mold assembly to soften the rubber includes heating the mold assembly to a temperature in the range of 50°–140° C.

6. The method of claim 1 further including the steps of: assembling core bar inserts into the inner mold half of the first mold assembly prior to placing the first quantity of rubber, and, assembling core bar inserts into the inner mold half of the second mold assembly prior to positioning the third quantity of rubber.

7. A method for producing an endless rubber track, comprising the steps of:

a.) providing a pair of first mold assemblies in a horizontal position, each mold assembly including an inner mold half having a cavity patterned in the form of an interior of the rubber track, an outer mold half which mates with the inner mold half having a cavity patterned in the form of an exterior portion of the rubber track, a removable subplate positioned between the inner and outer mold halves, and positioning means for positioning the inner mold half, the outer mold half and the removable subplate in relationship to one another, the inner mold halves pivotally connected to one another so that the mold assemblies can be rotated from a first horizontal position to a second vertical position;

b.) placing first quantities of green rubber adjacent the inner mold half of each of the first mold assemblies, the quantities of rubber being sufficient to fill the inner mold half cavities;

c.) positioning a first side of each of the subplates of the first mold assemblies adjacent to the first quantities of green rubber utilizing positioning means;

d.) placing second quantities of green rubber adjacent a second side of each of the subplates of the first mold assemblies, the quantities of rubber being sufficient to fill the outer mold half cavities;

e.) positioning each of the outer mold halves of the first mold assemblies over the second quantities of green rubber utilizing positioning means;

f.) pivoting the first mold assemblies from the horizontal position to the vertical position;

g.) heating the first mold assemblies to an elevated temperature sufficient to soften the first and second quantities of green rubber while applying sufficient pressure to flow the softened rubber into the mold cavities without vulcanizing the rubber; next h.) separating the inner and outer mold halves and removing the subplate while the rubber remains in the inner and outer mold halves of the first mold assembly;

i.) placing a portion of a green belt in the shape of an endless loop between the inner and outer mold halves;

j.) closing the rubber-containing mold halves of the first mold assemblies against the green belt portion so that it is sandwiched between the inner and outer mold halves to form assemblies, each assembly having a central portion of preselected length P and two end portions each having a preselected length L;

k.) applying heat to elevate the temperature of the green rubber in the central portion of the assemblies to a temperature above the vulcanizing temperature of the rubber, while simultaneously maintaining the end portions of the assemblies at a temperature below the vulcanization temperature of the rubber, and applying pressure to the assemblies to form rubber track segments each with a length of P+2L, the rubber track segments each having a vulcanized rubber track segment central portion of length P and green rubber track segment end portions each having preselected length L;

l.) removing the mold halves of the first mold assemblies from the formed rubber track segments;

m.) providing a pair of second mold assemblies in a horizontal position, each mold assembly including:

an inner mold half having a cavity with a first surface finish and patterned in the form of an interior of the rubber track, an outer mold half which mates with the inner mold half having a cavity with a second surface finish and patterned in the form of an exterior portion of the rubber track, a removable subplate having two end portions and a central portion extending between the end portions, each of the end portions having a length greater than preselected length L, an inner portion patterned in the form of the interior portion of the rubber track so as to engage a portion of the inner mold half cavity, an outer portion patterned in the form of the exterior portion of the rubber track so as to engage a portion of the outer mold half cavity, and a central portion of a preselected length in the form of a substantially flat plate extending between the end portions, the subplate positioned between the inner and outer mold halves, positioning means for positioning the inner mold half, the outer mold half and the removable subplate in relationship to one another, and the inner mold halves pivotally connected to one another so that the mold assemblies can be rotated from a first horizontal position to a second vertical position;

n.) placing a third quantity of green rubber adjacent each of the inner mold halves of the second mold assemblies, the quantities of rubber being sufficient to fill the inner mold half cavities opposite the central portions of the subplates;

o.) positioning a first side of each of the subplates of the second mold assemblies adjacent to the third quantities of green rubber utilizing positioning means;

p.) placing a fourth quantity of green rubber adjacent a second side of each of the subplates of the second mold assemblies, the quantities of rubber being sufficient to fill the outer mold half cavities opposite the central portion of the subplates;

q.) positioning the outer mold halves of each of the second mold assemblies over the fourth quantities of green rubber utilizing positioning means;

r.) pivoting the second mold assemblies from the horizontal position to the vertical position;

s.) heating the second mold assemblies to an elevated temperature sufficient to soften the third and fourth quantities of green rubber while applying sufficient pressure to flow the rubber into the central portion of mold cavities without vulcanizing the rubber and preventing rubber from flowing into the mold adjacent the end portions of the subplate; next t.) separating the inner and outer mold halves and removing the subplates while the rubber remains in the inner and outer mold halves of the second mold assemblies;

u.) placing the portions of the green belt located between formed rubber track segments having vulcanized central portions of length P and green rubber end portions of length L, the green belt being located between the central portions of the mold half cavities of the second mold assemblies, the cavities being filled with green rubber;

v.) closing the mold halves of the second mold assemblies against the green belt portion so that the green belt portions are sandwiched between the central portions of the inner and outer mold halves, and the green rubber track segments end portions of length L are captured in the end portions of the cavities of the second mold assemblies, the end portion cavities having a length greater than preselected length L;

w.) applying heat to raise the temperature of the green rubber in the second mold assemblies to a temperature above the vulcanizing temperature of the rubber, while applying pressure to the assemblies to form an endless vulcanized rubber track; and, x.) removing the mold halves of the second mold assemblies from the vulcanized track segment.

8. Apparatus for producing an endless rubber track comprising:

a first mold assembly for forming partially vulcanized rubber track segments, the first mold assembly including an inner mold half having a first end and a second end free of a cavity pattern and a center portion including a cavity patterned in the form of an interior of the rubber track, an outer mold half having a first end and a second end free of a cavity pattern and a center portion including a cavity patterned in the form of an exterior of the rubber track, the outer mold half mating with the inner mold half, a removable subplate positioned between the inner and outer mold halves, positioning means for positioning the inner mold half, the outer mold half and the removable subplate in relationship to one another, and cooling means to cool the mold halves for a preselected length L from the mold half ends;

heating means for heating the center portion of the first mold assembly, and;

insulation positioned at the preselected length L from the mold half ends;

a second mold assembly for fully vulcanizing rubber track segments, the second mold assembly including an inner mold half having a first end and a second end and including a cavity patterned in the form of an interior of the rubber track, an outer mold half having a first end and a second end and including a cavity patterned in the form of an exterior of the rubber track, the outer mold half mating with the inner mold half, a removable subplate having two end portions and a central portion extending between the end portions, each of the end portions having a length greater than the preselected length L, and further having an inner portion patterned in the form of the interior portion of the rubber track so as to engage a portion of the inner mold half cavity, an outer portion patterned in the form of the exterior portion of the rubber track so as to engage a portion of the outer mold half cavity, and a central portion in the form of a substantially flat plate extending between the end portions, the subplate positioned between the inner and outer mold halves, and positioning means for positioning the inner mold half, the outer mold half and the removable subplate in relationship to one another; and heating means for heating the second mold assembly.

9. The apparatus of claim 8 wherein the inner mold halves of the first and second mold assemblies include a plurality of notches in the inner mold half cavities.

10. The apparatus of claim 8 wherein the heating means for the first mold assembly and the second mold assembly are steam channels positioned in the inner and outer mold halves.

11. The apparatus of claim 8 wherein the heating means for the first mold assembly and the second mold assembly are electrical resistance heating elements positioned in the inner and outer mold halves.

12. The apparatus of claim 8 wherein the subplates of the first and second mold assemblies have a surface finish which is smoother than surface finishes of the inner and outer mold halves.

13. Apparatus for producing an endless rubber track, comprising:

a pair of first mold assemblies for forming partially vulcanized rubber track segments, each mold assembly including an inner mold half having a cavity patterned in the form of an interior of the rubber track including a center portion extending between first and second end portions, said end portions being free of said cavity, an outer mold half which mates with the inner mold half having a cavity patterned in the form of an exterior portion of the rubber track including a center portion extending between first and second end portions, said end portions being free of said cavity, a removable subplate positioned between the inner and outer mold halves, positioning means for positioning the inner mold half, the outer mold half and the removable subplate in relationship to one another, cooling means to cool the first and second end portions of the mold halves for a preselected length L, and pivot means connecting the inner mold halves of each assembly to pivot the assemblies from a horizontal to a vertical position;

heating means for heating the center portion of the first mold assemblies;

a pair of second mold assemblies for fully vulcanizing rubber track segments, each of the second mold assemblies including an inner mold half having a cavity patterned in the form of an interior of the rubber track, an outer mold half which mates with the inner mold half having a cavity patterned in the form of an exterior portion of the rubber track, a removable subplate having two end portions and a central portion extending between the end portions, each of the end portions having a length greater than preselected length L, having an inner portion patterned in the form of the interior portion of the rubber track so as to engage a portion of the inner mold half cavity, an outer portion patterned in the form of the exterior portion of the rubber track so as to engage a portion of the outer mold half cavity, and a central portion in the form of a substantially flat plate extending between the end portions, the subplate positioned between the inner and outer mold halves, positioning means for positioning the inner mold half, the outer mold half and the removable subplate in relationship to one another; and pivot means connecting the inner mold halves of said second assemblies to pivot the assemblies from a horizontal to a vertical position; and heating means for heating the second mold assemblies.

14. The apparatus of claim 13 wherein the subplates of the first and second mold assemblies have a surface finish which is smoother than surface finishes of the inner and outer mold halves.

\* \* \* \* \*